(12) United States Patent
Maitre et al.

(10) Patent No.: US 9,451,319 B2
(45) Date of Patent: Sep. 20, 2016

(54) STREAMING DIGITAL CONTENT WITH FLEXIBLE REMOTE PLAYBACK

(75) Inventors: Matthieu Maitre, Redmond, WA (US); Zane Salim, Seattle, WA (US); Catalin C. Cazangiu, Redmond, WA (US); Ramees Khan Rahumathulla, Redmond, WA (US); Anders Edgar Klemets, Redmond, WA (US); Shafiq Rahman, Redmond, WA (US); Gabriel Frost, Seattle, WA (US); Ivan Mladenov, Redmond, WA (US); Jose Contreras, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 667 days.

(21) Appl. No.: 12/972,034

(22) Filed: Dec. 17, 2010

(65) Prior Publication Data

US 2012/0158984 A1 Jun. 21, 2012

(51) Int. Cl.
*G06F 15/16* (2006.01)
*G06F 15/173* (2006.01)
(Continued)

(52) U.S. Cl.
CPC .... *H04N 21/43615* (2013.01); *H04N 21/4325* (2013.01); *H04N 21/440218* (2013.01); *H04N 21/643* (2013.01); *H04N 21/6587* (2013.01); *H04N 21/8543* (2013.01)

(58) Field of Classification Search
CPC ....... H04L 67/02; H04L 67/10; H04L 67/22; H04L 67/34; H04L 67/42; H04L 67/2828; H04L 65/608; H04L 65/4076; H04L 65/104; H04L 65/1069; H04L 65/605; H04L 65/80; H04L 65/40; H04L 65/607

USPC ................ 709/203, 217, 219, 223, 227–228, 709/229–231
See application file for complete search history.

(56) References Cited

U.S. PATENT DOCUMENTS

| 7,313,808 B1 | 12/2007 | Gupta |
| 7,614,075 B2 | 11/2009 | McDowell |

(Continued)

FOREIGN PATENT DOCUMENTS

| CN | 101079973 | 11/2007 |
| CN | 101800886 | 8/2010 |
| WO | WO02/084980 | 10/2002 |

OTHER PUBLICATIONS

Apple Inc., "Apple TV," downloaded from http://www.apple.com/appletv/, 6 pages (document not dated, downloaded on Oct. 8, 2010).
(Continued)

*Primary Examiner* — Farzana Huq
(74) *Attorney, Agent, or Firm* — Sunah Lee; Dan Choi; Micky Minhas

(57) ABSTRACT

Disclosed herein are representative embodiments of methods, apparatus, and systems for facilitating the streaming of digital media content to a remote device. In one exemplary embodiment, a translation layer translates markup language code and/or scripting language code (e.g., code that complies with the HTML5/W3C standard) to comply with a streaming protocol (e.g., a streaming protocol specified by the Digital Living Network Alliance (DLNA)) to facilitate streaming of digital content (e.g., digital video, digital audio, or digital images) to remote devices (e.g., a digital television, digital audio player, game console, etc.). In some embodiments, a translation layer translates streaming protocol events at a remote device into other events (e.g., events specified in the HTML5 standard) at a local computing device. Local/remote playback switching logic can also facilitate switching between local playback and remote playback.

20 Claims, 12 Drawing Sheets

(51) Int. Cl.
H04N 21/436 (2011.01)
H04N 21/643 (2011.01)
H04N 21/432 (2011.01)
H04N 21/4402 (2011.01)
H04N 21/6587 (2011.01)
H04N 21/8543 (2011.01)

(56) References Cited

U.S. PATENT DOCUMENTS

| | | | |
|---|---|---|---|
| 2006/0047750 A1* | 3/2006 | Schmitt et al. | 709/204 |
| 2006/0230169 A1 | 10/2006 | Kaplan | |
| 2008/0134012 A1* | 6/2008 | Kokes | G06F 17/30017 715/201 |
| 2008/0228854 A1* | 9/2008 | Grimault | H04L 12/2818 709/201 |
| 2009/0003600 A1 | 1/2009 | Chen et al. | |
| 2010/0083113 A1 | 4/2010 | Weaver | |
| 2010/0192065 A1 | 7/2010 | Se | |
| 2011/0087795 A1* | 4/2011 | Puri et al. | 709/231 |
| 2012/0096083 A1* | 4/2012 | Teng et al. | 709/203 |
| 2012/0254926 A1* | 10/2012 | Takahashi et al. | 725/98 |
| 2012/0311721 A1* | 12/2012 | Chen | H04N 7/1675 726/27 |
| 2012/0331510 A1* | 12/2012 | Lin et al. | 725/62 |

OTHER PUBLICATIONS

Boxee, Inc., "Watch Movies, TV Shows and clips from the Internet on your TV," downloaded from http://www.boxee.tv/, 3 pages (document not dated, downloaded on Dec. 6, 2010).
Contributing Members of the UPnP Forum, "UPnP AV Architecture: 1," Version 1.1, 30 pages (Sep. 30, 2008).
Contributing Members of the UPnP Forum, "AVTransport: 1 Service Template Version 1.01," 66 pages (Jun. 25, 2002).
Contributing Members of the UPnP Forum, "ConnectionManager:1 Service Template Version 1.01," 25 pages (Jun. 25, 2002).
Contributing Members of the UPnP Forum, RenderingControl:1 Service Template Version 1.01, 63 pages (Jun. 25, 2002).
Digital Living Network Alliance, "Home-DLNA," downloaded from http://www.dlna.org/home, 1 page (document not dated, downloaded on Oct. 8, 2010).
Digital Living Network Alliance, "The DLNA Networked Device Interoperability Guidelines," downloaded from http://www.dlna.org/industry/certification/guidelines/, 2 pages (document not dated, downloaded on Mar. 2, 2011).
e7blog, "Engineering Windows 7: Media Streaming with Windows 7," downloaded from http://blogs.msdn.com/b/e7/archive/2009/05/12/media-streaming-with-windows-7.aspx, 19 pages (document marked May 12, 2009, downloaded on Oct. 8, 2010).
"From the DLNA Interoperability Guidelines—Architecture and Protocols Volume," downloaded from http://www.dlna.org/industry/certification/guidelines/DLNA_Glossary_of_Acronyms_and_Terms.pdf, 35 pages (document not dated, downloaded on Dec. 1, 2010).
Google Inc., "Features—Google TV," downloaded from http://www.google.com/tv/features.html, 6 pages (document not dated, downloaded on Dec. 6, 2010).
Headquarters, Inc., "Wireless PC-to-TV stream device offers drivers for compatibility with multiple devices," downloaded from http://www.drivershq.com/news/Drivers/Wireless-PC-to-TV-stream-device-offers-drivers-for-compatibility-with-multiple-devices/101/786.aspx, 2 pages (document marked Aug. 27, 2010).
MediaMall Technologies, Inc., "How it works—PlayOn," downloaded from http://www.playon.tv/how-it-works, 2 pages (document not dated, downloaded on Dec. 6, 2010).
MediaMall Technologies, Inc., "PlayOn," 11 pages, (document not dated, downloaded on Dec. 6, 2010).
MediaMall Technologies, Inc., "PlayOn Digital Media Server," downloaded from http://www.playon.tv/playon, 1 page (document not dated, downloaded on Oct. 8, 2010).
Microsoft Corp., "Windows Media Center, Learn more—Using extenders," downloaded from http://www.microsoft.com/windows/windows-media-center/learn-more/extenders/default.aspx, 3 pages (document not dated, downloaded on Oct. 8, 2010).
Netflix, Inc., "Unlimited TV Shows Online & Movies Online, plus DVDs," downloaded from http://www.netflix.com/, 1 page (document not dated, downloaded on Oct. 8, 2010).
Roku, Inc., "Roku Digital Video Player," downloaded from http://www.roku.com/, 1 page (document not dated, downloaded on Oct. 8, 2010).
StreetCorner Media, LLC, "DLNA: Takes On Tech," downloaded from http://www.takesontech.com/?tag=dlna&paged=2, 14 pages (document marked Mar. 25, 2010-Aug. 2, 2010).
TVersity, "TVersity—Supported Devices," downloaded from http://tversity.com/support/devices, 5 pages (document not dated, downloaded on Oct. 11, 2010).
W3C, "4.8.6 The Video Element—HTML5," downloaded from http://www.w3.org/TR/html5/video.html, 21 pages (document not dated, downloaded on Nov. 10, 2010).
W3C, "4.8 Embedded Content—HTML5," downloaded from http://dev.w3.org/html5/spec/embedded-content-1.html, 28 pages (document not dated, downloaded on Dec. 2, 2010).
Yahoo!, "Yahoo! Connected TV: Movies, TV Shows, Internet On Demand," downloaded from http://connectedtv.yahoo.com/, 2 pages (document not dated, downloaded on Oct. 8, 2010).
Second Office Action from Chinese Patent Application No. 201110422984.9, dated Jul. 21, 2014, 3 pages.
First Office Action from Chinese Patent Application No. 201110422984.9, dated Dec. 30, 2013, 5 pages.

* cited by examiner

STREAMING DIGITAL CONTENT WITH FLEXIBLE REMOTE PLAYBACK

BACKGROUND

As digital content becomes more diverse and readily available on the Internet, consumers are looking for more convenient ways to access such content. A modern home typically has several devices (e.g., PCs, digital televisions, game consoles, smart phones, and other such digital content playback devices) that can be used to access, edit, store, or play digital content such as video, audio, or images. Some devices provide greater convenience and ease of movement. For example, smart phones are highly portable and provide a wide variety of functionality. Other devices provide a more desirable user experience for certain kinds of content. For example, wide-screen digital televisions are well-suited for viewing digital video content in a home theater arrangement. Today's consumer wants to leverage the advantages of each of her devices when accessing the wide variety of digital content available on the Internet.

SUMMARY

Disclosed herein are representative embodiments of methods, apparatus, and systems for facilitating streaming of digital content and remote playback of digital content at a remote device. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any specific advantage be present or problem be solved.

In examples described herein, code received at a local computing device can be translated to comply with a streaming protocol in order to facilitate the processing of content associated with the code by a remote playback device. For example, a translation layer on a PC that receives markup language code and/or scripting language code (e.g., code that complies with the HTML5/W3C standard) from a remote server (e.g., via a web browser) can automatically convert such code into corresponding calls in a streaming protocol (e.g., a streaming protocol specified by the Digital Living Network Alliance (DLNA)) to facilitate streaming of digital content (e.g., digital video, digital audio, or digital images) to a wide range of remote devices (e.g., a digital television, digital audio player, game console, etc.). Translations also can be performed in the other direction. For example, a translation layer at a local computing device can automatically translate streaming protocol events from a remote device into other events (e.g., events specified in the HTML5 standard) at a local computing device. Local/remote playback switching logic can provide flexible remote playback by facilitating switching between local playback of content on a local computing device and remote playback at another device. Described translation and playback switching technology can be used, for example, to allow users to combine the convenience of web browsing on a local computing device (e.g., a laptop computer) with the viewing experience provided by other devices (e.g., a large-screen TV).

The foregoing and other objects, features, and advantages of the invention will become more apparent from the following detailed description, which proceeds with reference to the accompanying figures.

DETAILED DESCRIPTION

I. Overview

Figure 1:
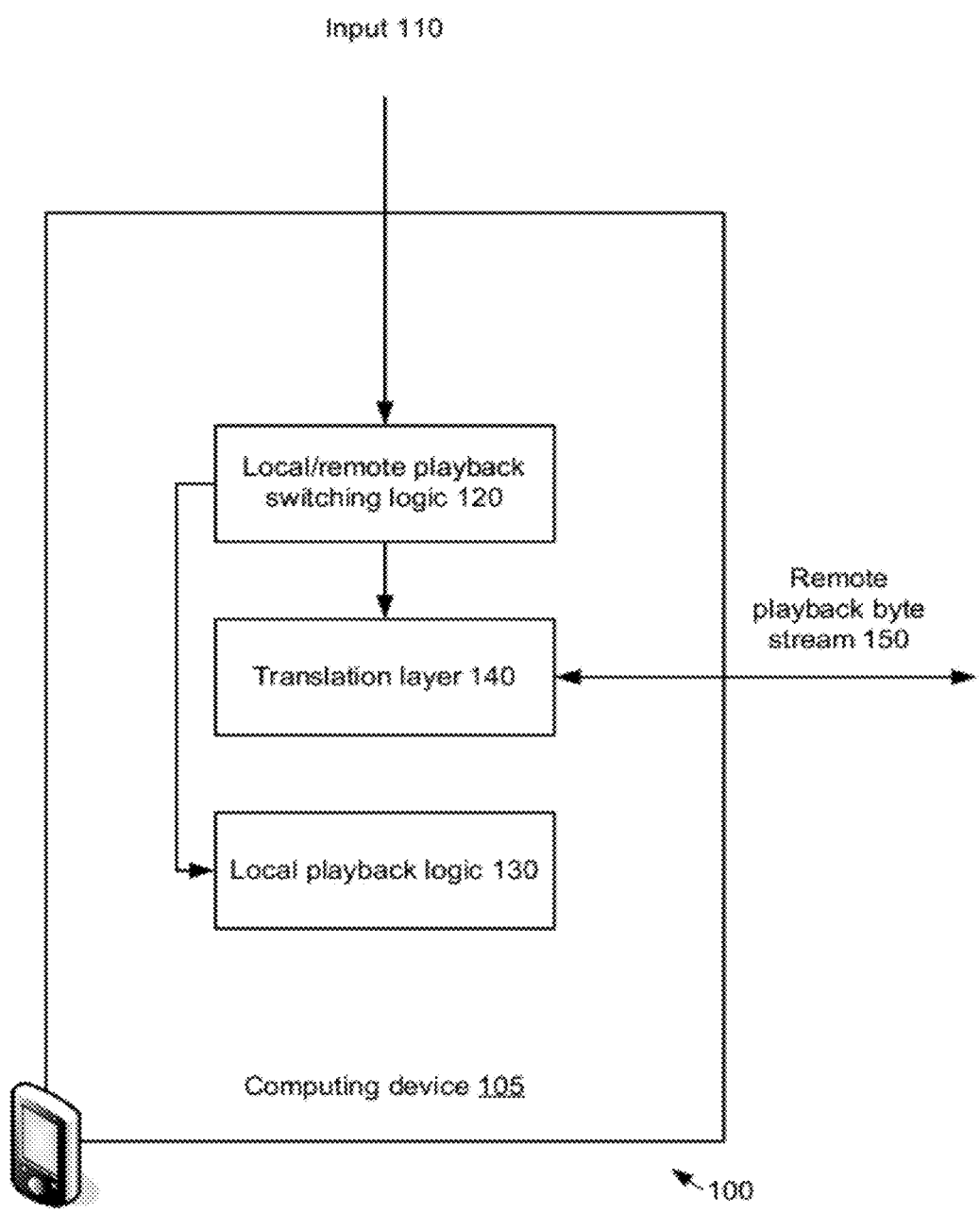
FIG. 1 is a block diagram of an exemplary system implementing technology described herein.

Disclosed herein are representative embodiments of methods, apparatus, and systems for facilitating streaming of digital content and remote playback of digital content at a remote device. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems.

The disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer or image processor embedded in a device, such as a laptop computer, desktop computer, net book, web book, tablet computing device, smart phone, or other mobile computing device). Any of the intermediate or final data created and used during implementation of the disclosed methods or systems can also be stored on one or more computer-readable media (e.g., non-transitory computer-readable media).

For clarity, only certain selected aspects of the software-based embodiments are described. Other details that are well known in the art are omitted. For example, it should be understood that the software-based embodiments are not limited to any specific computer language or program. Likewise, embodiments of the disclosed technology are not limited to any particular computer or type of hardware. Exemplary computing environments suitable for performing any of the disclosed software-based methods are introduced below.

The disclosed methods can also be implemented using specialized computing hardware that is configured to perform any of the disclosed methods. For example, the disclosed methods can be implemented by an integrated circuit (e.g., an application specific integrated circuit ("ASIC"), a graphics processing unit ("GPU"), or programmable logic device ("PLD"), such as a field programmable gate array ("FPGA")) specially designed to implement any of the disclosed methods (e.g., dedicated hardware configured to perform any of the disclosed translations).

In examples described herein, code received at a local computing device can be translated to comply with a streaming protocol in order to facilitate processing of content at a remote device. Translation can include converting code into a different kind of code. For example, markup language code or scripting language code can be converted into translated code that complies with a streaming protocol. Translation also can include other interpretations of code. For example, different kinds of processing and data handling (e.g., in compliance with a streaming protocol) can occur (e.g., at a remote device) in response to received markup language code or scripting language code. Translation can also be used as part of the process of streaming content and/or related information to a remote device (e.g., a digital television, digital audio player, game console, or other digital content playback device).

For example, a translation layer on a PC that receives markup language code and/or scripting language code (e.g., code that complies with the HTML5/W3C standard) from a remote server via a web browser can automatically convert such code into corresponding calls in a streaming protocol (e.g., a streaming protocol specified by the Digital Living Network Alliance (DLNA)) in order to stream digital content (e.g., digital video, digital audio, or digital images) to a wide range of remote devices (e.g., a digital television, digital audio player, game console, or other digital content playback device). A translation layer also can perform translations in the other direction. For example, a translation layer at a local computing device can automatically convert streaming protocol events received from a remote device into other events (e.g., events specified in the HTML5 standard).

As further described herein, local/remote playback switching logic at a local computing device can be used to switch between local playback of acquired content on the local computing device and remote playback at another device. Described translation and playback switching technology can be used, for example, to allow users to combine the convenience of web browsing on a local computing device (e.g., a laptop computer) with the viewing experience provided by other devices (e.g., a large-screen TV).

As applied to devices described herein, the term "remote" is used to refer to devices other than a local computing device. Remote devices can be accessible by a local computing device over the Internet, a wide area network, a local network (e.g., an Ethernet network, Wi-Fi network, or other network covering a small geographic area, such as a home or office), or other some other network. As applied to playback or other processing described herein, the term "remote" is used to refer to the playback or other processing at a remote device.

A. Exemplary System with Translation Layer and Local/Remote Switching

FIG. 1 is a block diagram of an exemplary system 100 implementing technologies described herein. In the example, a computing device 105 implements local/remote playback switching logic 120 and a translation layer 140.

In the example shown in FIG. 1, computing device 105 receives input 110. Input 110 comprises information representing digital content such as digital video, digital audio, or digital images. Input 110 also can include other types of input, such as user input. For example, computing device 105 can accept user input that indicates a user's selection of local playback or remote playback of the digital content.

Local/remote playback switching logic 120 allows the system 100 to select local playback at computing device 105, or remote playback at a remote device. For example, in response to user input, the system 100 can use local/remote playback switching logic 120 to switch between local playback using local playback logic 130, or remote playback at a remote device (e.g., a remote DLNA-compliant device) such as a digital television, game console, or other digital content playback device. Local/remote playback switching logic 120 can be implemented in different ways. For example, local/remote playback switching logic 120 can be included in a software element at computing device 105. In a described example, local/remote playback switching logic is included in a software element that represents digital content for playback (e.g., local playback or remote playback). A software element that represents media data (e.g., video data and/or audio data) for playback can be referred to as a media element. A software element that represents image data for playback can be referred to as an image element. Local playback logic 130 and playback logic at remote devices (not shown) can include, for example, video, audio, or image decoders that decode encoded video, audio, or image information, respectively.

In translation layer 140, translation is performed. For example, translation layer 140 can automatically translate markup language code and/or scripting language code that complies with the HTML5/W3C standard into translated code that complies with a streaming protocol (e.g., a streaming protocol specified by DLNA). The translated code can then be sent via remote playback byte stream 150 to another device such as a digital television, game console, or other digital content playback device for remote playback.

In practice, the systems shown herein such as system 100 can include additional system components, additional relationships between system components, and the like. For example, the system 100 can include one or more transcoders that transcode video data, audio data or image data. Transcoders can be used, for example, to convert media data to a different coded format when the media data is received in a coded format that is not supported by a remote device. The exact operations performed by such transcoders can vary depending on input and output compression formats.

The relationships shown between modules within the system 100 indicate general flows of information in the system; other relationships are not shown for the sake of simplicity. Depending on the implementation and the type of processing desired, modules of the system can be added, omitted, split into multiple modules, combined with other modules, and/or replaced with like modules. Generally, the technologies described herein are generic to different operating systems or hardware and can be applied in any variety of environments to take advantage of the described features.

B. Exemplary Techniques

Figure 2:
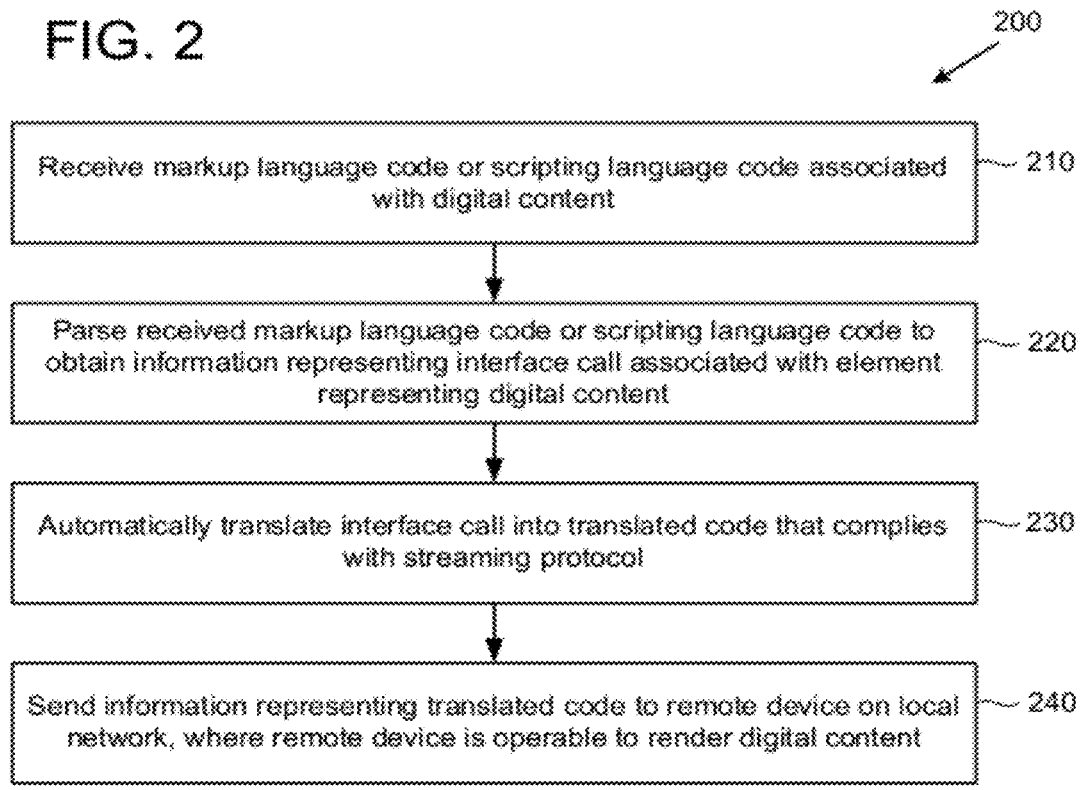
FIG. 2 is a flowchart of an exemplary technique for translating markup language code or scripting language code to comply with a streaming protocol.

FIG. 2 shows an exemplary technique 200 for translating markup language code or scripting language code (e.g., interface calls) for elements representing digital content. A system such as the system 100 shown in FIG. 1 or other system performs the technique 200.

At 210, the system receives markup language code or scripting language code (e.g., code that complies with HTML5) associated with digital content. For example, a user of a local computing device navigates to a web page via a web browser, and the local computing device receives markup language code and/or scripting language code via the web browser.

At 220, the system parses the received markup language code or scripting language code to obtain information representing an interface call associated with an element representing digital content. In described examples, elements representing digital content can include software elements (e.g., media elements that represent digital media content, or image elements that represent digital still image content) that implement interfaces. For example, markup language code can include an interface call to a media element (e.g., a <video> element or an <audio> element) that implements a media element interface (e.g., an HTMLMediaElement interface), or an image element (e.g., an <img> element) that implements an image element interface (e.g., an HTMLImageElement interface).

At 230, the system automatically translates the interface call into translated code that complies with a streaming protocol. For example, a translation layer at the local computing device automatically translates a call to an HTMLMediaElement interface or a call to an HTMLImageElement interface into translated code that complies with a streaming protocol (e.g., a UPnP streaming protocol specified by DLNA). The translation layer can be implemented in a software element (e.g., a media element). As described herein, translations involve receiving code to be translated and interpreting the received code in a prescribed manner. Exemplary translations for an HTMLMediaElement interface are shown in Tables 4-7, below. Exemplary translations for an HTMLImageElement interface are shown in Table 9, below. Exemplary translations described herein can be performed in different ways (e.g., by code in a media element or an image element that includes a translation layer, by code in software that is separate from a media element or an image element, by referring to a table or other data structure in which translation information is stored, or in some other way). Alternatively, the system translates interface calls differently, or translates other code.

At 240, the system sends information representing the translated code to a remote device operable to render the digital content (e.g., via a local network). For example, the local computing device sends information representing calls to an action of a UPnP AVTransport service via a byte stream to a remote device that is operable to render the digital content. Alternatively, the system translates interface calls differently, or translates other code.

Figure 3:
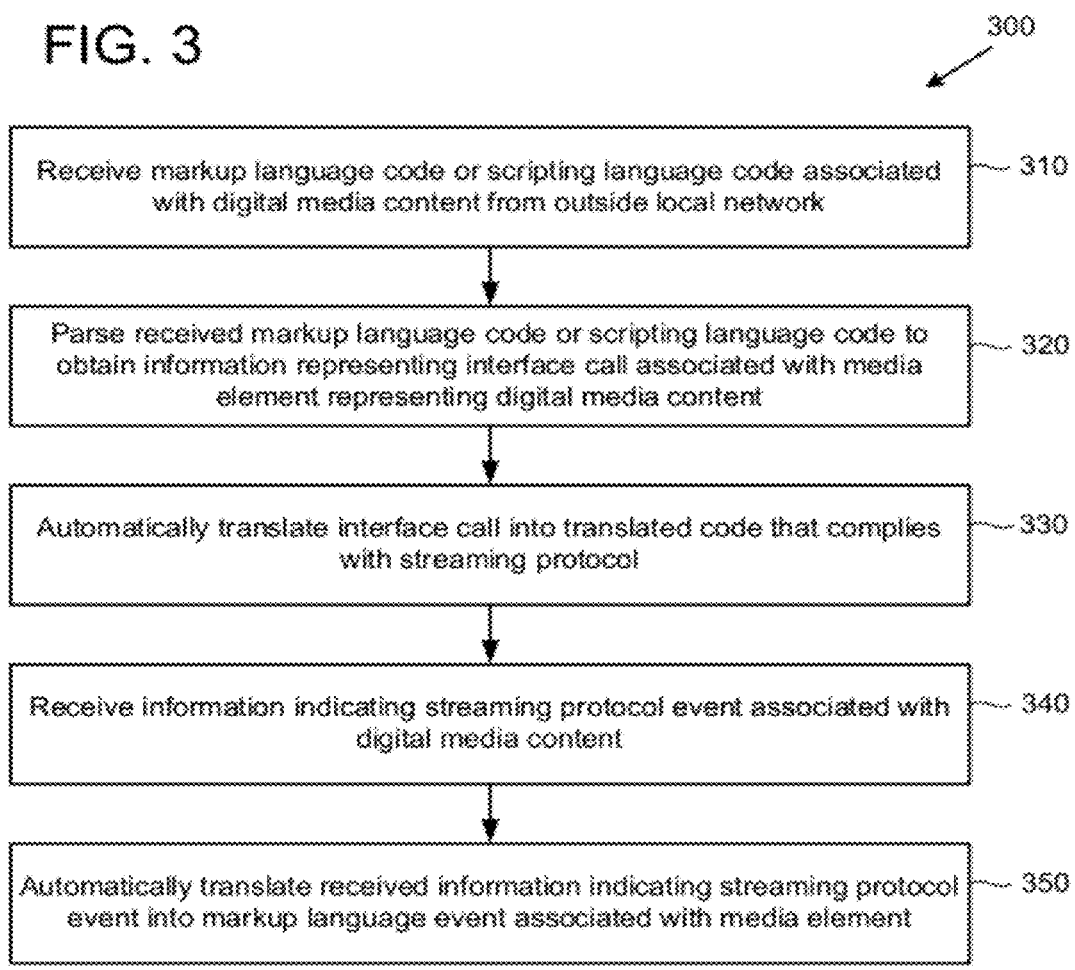
FIG. 3 is a flowchart of an exemplary technique for translating markup language code or scripting language code to comply with a streaming protocol, and for translating streaming protocol events into markup language events.

FIG. 3 shows an exemplary technique 300 for translating markup language code or scripting language code (e.g., interface calls) for media elements (e.g., <video> or <audio> elements) representing digital media content (e.g., digital video or digital audio) to comply with a streaming protocol, and for translating streaming protocol events into markup language events. A system such as the system 100 shown in FIG. 1 or other system performs the technique 300.

At 310, the system receives markup language code or scripting language code associated with digital media content from outside a local network. For example, a user of a local computing device on a local network navigates to a web page on the Internet via a web browser, and the local computing device receives markup language code and/or scripting language code via the web browser.

At 320, the system parses the received markup language code or scripting language code to obtain information representing an interface call associated with a media element representing the digital media content. For example, markup language code can include an interface call to a <video> element or <audio> element that implements an HTMLMediaElement interface.

At 330, the system automatically translates the interface call into translated code that complies with a streaming protocol. For example, a translation layer at the local computing device automatically translates a call to an HTMLMediaElement interface into translated code that complies with a streaming protocol (e.g., a UPnP streaming protocol specified by DLNA). Exemplary translations for an HTMLMediaElement interface are shown in Tables 4-7, below. Exemplary translations described herein can be implemented in different ways, such as by being implemented in code in a software element that includes a translation layer. Alternatively, the system translates interface calls differently, or translates other code.

At 340, the system receives information indicating a streaming protocol event associated with the digital media content. For example, a local computing device receives information indicating a streaming protocol event such as a pause, play, stop, playback rate change, or error event from an audio/visual transport service (e.g., a UPnP AVTransport service), or a change event (e.g., a volume change event) from a rendering control service (e.g., a UPnP RenderingControl service). The streaming protocol event can be generated in response to user input (e.g., video playback control input) at a remote device that renders the digital media content.

At 350, the system automatically translates information indicating the streaming protocol event into a markup language event associated with the media element. For example, a translation layer at the local computing device automatically translates a streaming protocol event to a corresponding HTML5 event associated with the media element. Exemplary translations for streaming protocol events are shown in Table 8, below. Exemplary translations described herein can be implemented in different ways, such as by being implemented in code in a software element that includes a translation layer. Alternatively, the system translates streaming protocol events differently, or translates other streaming protocol events.

C. Exemplary Code for Delivering Content

In examples described herein, markup language code and/or scripting language code can be used to deliver content to a local computing device. For example, markup language and/or scripting language code is provided by a remote server and processed by a web browser on a local computing device.

Some examples of markup language code and scripting language code described herein comply with HTML5. HTML5 is a revision of the HTML standard. However, exemplary technology described herein does not require compliance with any particular guideline or standard. For example, modified versions of exemplary interfaces, attributes, methods or events described herein, or different interfaces, attributes, methods or events, can be used.

HTML5 includes several types of elements, including the <video> element for video content, the <audio> element for audio content, and the <img> element for still image content.

1. Exemplary Interfaces for <Video> and <Audio> Elements

The <audio> and <video> elements are examples of media elements. Media elements are used to represent media data (e.g., video data, audio data). A complete audio file or video file that includes media data can be referred to as a media resource. Media data represented by a media element can be identified by an address (e.g., a valid URL) of a media resource (e.g., an MPEG-4 video file, an MP3 audio file, or some other media resource) in an attribute of the media element (e.g., a src attribute, as shown in Table 1, below).

In HTML5, media elements implement the HTMLMediaElement interface. The HTMLMediaElement interface exposes methods and attributes relating to different states and aspects of the media element. In HTML5, the HTMLMediaElement interface includes the methods and attributes shown in Table 1, below.

TABLE 1

Methods and attributes of HTMLMediaElement interface.

| Attribute/Method | Description |
| --- | --- |
| readonly attribute MediaError error | MediaError object, which takes the value of an error code (e.g., MEDIA_ERR_ABORTED, MEDIA_ERR_NETWORK, MEDIA_ERR_DECODE, or MEDIA_ERR_SRC_NOT_SUPPORTED. |
| attribute DOMString src | Gives an address (e.g., a valid, non-empty URL) of a media resource. |
| readonly attribute DOMString currentSrc | Address of current media resource. |
| readonly attribute unsigned short networkState | Represents current network activity of media element. Events fire to indicate changes in state. |
| const unsigned short NETWORK_EMPTY = 0 | Possible value of networkState attribute. |
| const unsigned short NETWORK_IDLE = 1 | Possible value of networkState attribute. |

TABLE 1-continued

Methods and attributes of HTMLMediaElement interface.

| Attribute/Method | Description |
| --- | --- |
| const unsigned short NETWORK_LOADING = 2 | Possible value of networkState attribute. |
| const unsigned short NETWORK_NO_SOURCE 3 | Possible value of networkState attribute. |
| attribute DOMString preload | Provides information to user agent regarding whether resource is expected to be available for download. |
| readonly attribute TimeRanges buffered | TimeRanges object that represents time ranges of a media resource that has been buffered by a user agent. |
| void load() | Invokes a media element load algorithm. |
| DOMString canPlay Type (in DOMString type) | Returns empty string, "maybe" or "probably" based on confidence that media resource of the given type can be played. |
| readonly attribute unsigned short readyState | Value that describes degree to which media element is ready to be rendered at current playback position. |
| const unsigned short HAVE_NOTHING = 0 | Possible value of readyState attribute. |
| const unsigned short HAVE_METADATA = 1 | Possible value of readyState attribute. |
| const unsigned short HAVE_CURRENT_DATA = 2 | Possible value of readyState attribute. |
| const unsigned short HAVE_FUTURE_DATA = 3 | Possible value of readyState attribute. |
| const unsigned short HAVE_ENOUGH_DATA = 4 | Possible value of readyState attribute. |
| readonly attribute boolean seeking | TRUE if the user agent is currently seeking to a new playback position, otherwise FALSE. |
| readonly attribute TimeRanges seekable | TimeRanges object that represents time ranges of a media resource to which it is possible to seek. |
| attribute double currentTime | Current playback positioin, in seconds. |
| readonly attribute double initialTime | Initial playback position when media resource was loaded. |
| readonly attribute double duration | Length of media resource, in seconds. |
| readonly attribute Date startOffsetTime | Date object that represents a media timeline offset for the media resource. |
| attribute double defaultPlaybackRate | Default playback rate (i.e., not fast forwarding, rewinding, etc.) |
| attribute double playbackRate | Current playback rate (1.0 is normal speed). |
| readonly attribute TimeRanges played | TimeRanges object that represents time ranges of a media resource that a user agent has played. |
| readonly attribute boolean paused | TRUE if playback is paused, otherwise FALSE. |
| readonly attribute boolean ended | TRUE if playback has reached end of media resource, otherwise FALSE. |
| attribute boolean autoplay | Indicates whether playback will begin automatically once the media resource can play without stopping. |
| attribute boolean loop | Indicates whether media element will seek back to beginning of media resource when the end is reached. |
| void play() | Sets paused attribute to FALSE. Loads media resource if necessary, and begins playback. If playback has ended (reached the end of the media resource), playback is restarted from the start. Causes "play" event to be fired, along with either "waiting" or "playing" event (depending on value of readyState attribute). |
| void pause() | Sets paused attribute to TRUE. Loads media resource if necessary. Causes "timeupdate" and "pause" events to be fired. |
| attribute boolean controls | Indicates whether scripted controller has been provided. User agent can use own controls if no scripted controller is provided. |

TABLE 1-continued

Methods and attributes of HTMLMediaElement interface.

| Attribute/Method | Description |
|---|---|
| attribute double volume | Current playback colume, in range from 0.0 (silence) to 1.0 (full volume). |
| attribute boolean muted | TRUE if audio is muted, otherwise FALSE. |

In HTML5, <video> and <audio> elements also implement an HTMLVideoElement and HTMLAudioElement interface, respectively. The HTMLVideoElement interface derives from the HTMLMediaElement interface, while adding some methods and properties. The HTMLAudioElement interface also derives from the HTMLMediaElement interface, without adding methods or properties. The HTMLMediaElement interface derives from the HTMLElement interface. The HTMLSourceElement interface also relates to <audio> and <video> elements and derives from the HTMLElement interface. For brevity, the HTMLElement, HTMLVideoElement, HTMLAudioElement, and HTMLSourceElement interfaces are not described in detail herein. For further information on these and other interfaces, see the HTML5 standard.

2. Events for <Video> and <Audio> Elements

HTML5 also defines several events that relate to media elements such as <audio> and <video> elements. In HTML5, events occur (or "fire") on media elements as shown in Table 2, below.

TABLE 2

HTML5 events relating to media elements.

| Event Name | Description |
|---|---|
| loadstart | Fired when user agent begins looking for media data. Precondition: networkState = NETWORK_LOADING. |
| progress | Fired when user agent is fetching media data. Precondition: networkState = NETWORK_LOADING. |
| suspend | Fired when user agent is not fetching media data, but the entire media resource has not been downloaded. Preconditions: networkState = NETWORK_IDLE. |
| abort | Fired when user agent stops fetching media data before the entire media resource has not been downloaded, but not due to error. Precondition: The error attribute indicates MEDIA_ERR_ABORTED; networkState = NETWORK_EMPTY or NETWORK_IDLE. |
| error | Fired when error occurs while fetching media data. Precondition: The error attribute indicates error state such as MEDIA_ERR_NETWORK. Precondition: networkState = NETWORK_EMPTY or NETWORK_IDLE. |
| emptied | Fired when networkState has just switched to NETWORK_EMPTY state. Preconditions: networkState = NETWORK_EMPTY; other attributes are in initial states. |
| stalled | Fired when user agent tries to fetch media data but the data is not arriving. Precondition: networkState = NETWORK_LOADING |
| play | Fired when playback has begun (after play() method has returned, or in response to autoplay attribute). Precondition: paused attribute has just been set to FALSE. |
| pause | Fired when playback has been paused (after paus() method has returned). Precondition: paused attribute has just been set to TRUE. |

TABLE 2-continued

HTML5 events relating to media elements.

| Event Name | Description |
|---|---|
| loadedmetadata | Fired when user agent has determined duration and dimensions of media resource. Precondition: readyState has just been set to HAVE_METADATA, HAVE_CURRENT_DATA, HAVE_FUTURE_DATA or HAVE_ENOUGH_DATA. |
| loadeddata | Fired when user agent can render the media data for the first time. Precondition: readyState has just been set to HAVE_CURRENT_DATA, HAVE_FUTURE_DATA or HAVE_ENOUGH_DATA for the first time. |
| waiting | Fired when playback is stopped because next frame is not available, but is expected to become available. Preconditions: readyState has just been set to HAVE_CURRENT_DATA, ; HAVE_METATDATA, or HAVE_NOTHING paused = FALSE; either seeking = TRUE or the current playbackposition is not in a range specified by the buffered attribute. |
| playing | Fired when playback has started. Preconditions: readyState has just been set to HAVE_FUTURE_DATA or HAVE_ENOUGH_DATA; paused = FALSE; seeking = FALSE or the current playback position is in a range specified by the buffered attribute. |
| canplay | Fired when user agent can resume playback but it is estimated that further buffering is needed to play to the end. Precondition: readyState has just been set to HAVE_FUTURE_DATA or HAVE_ENOUGH_DATA. |
| canplaythrough | Fired when user agent can resume playback and it is estimated that no further buffering is needed to play to the end. Precondition: readyState has just been set to HAVE_ENOUGH_DATA. |
| seeking | Fired when seeking attribute has changed to TRUE and seek is taking long enough to fire the event. |
| seeked | Fired when seeking attribute has changed to FALSE. |
| timeupdate | Fired when playback position changes. |
| ended | Fired when playback has stopped because the end of the media resource has been reached. Preconditions: currentTime is the end of the media resource; ended = TRUE. |
| ratechange | Fired when defaultPlaybackRate or playbackRate is updated. |
| durationchange | Fired when duration attribute is updated. |
| volumechange | Fired when volume attribute or muted attributed is updated. |

3. Interface for <img> Elements

The <img> element implements the HTMLImageElement interface. The HTMLImageElement interface exposes attributes relating to an image resource. In HTML5, the HTMLImageElement interface includes the attributes shown in Table 3, below.

TABLE 3

Attributes of the HTMLImageElement interface.

| Attribute | Description |
|---|---|
| attribute DOMString alt | Gives alternative text or replacement data for the image resource, to be used where the image data is not available. |
| attribute DOMString src | Gives an address (e.g., valid, non-empty URL) of an image resource. |
| attribute DOMString useMap | If present, indicates an associated image map for the image. |
| attribute boolean isMap | Indicates whether the image element provides access to a server-side image map. |

TABLE 3-continued

Attributes of the HTMLImageElement interface.

| Attribute | Description |
| --- | --- |
| attribute unsigned long width | Gives the rendered width of the image resource. |
| attribute unsigned long height | Gives the rendered height of the image resource. |
| readonly attribute ubsigned long naturalWidth | Gives the intrinsic width of the image resource. |
| readonly attribute unsigned long naturalHeight | Gives the intrinsic height of the image resource. |
| readonly attribute boolean complete | TRUE if image is completely downloaded or if no image is specified, otherwise FALSE. |

The HTMLImageElement interface derives from the HTMLElement interface. For brevity, the HTMLElement interface is not described in detail herein. For further information on these and other interfaces, see the HTML5 standard.

D. Exemplary Device Model

In examples described herein, devices comply with device models specified by the DLNA. However, exemplary technology described herein does not require compliance with any particular guideline or standard.

DLNA interoperability guidelines use a device model having several device classes that can be divided into one or more device categories. Each device class includes a set of device functions. The set of device functions is not tied to any particular type of device; devices having different physical attributes (e.g., different form factors) may possess the same set of device functions. Under the DLNA interoperability guidelines, a DLNA-compliant device supports at least one device class. A single DLNA-compliant device can support more than one device class.

One category of device classes is home network devices (HND). Some examples of FIND device classes are digital media server (DMS), digital media player (DMP), digital media renderer (DMR), and digital media controller (DMC). The DMS class is for devices that expose and distribute digital media content to other devices. Typical examples of DMS devices include PCs, DVRs and smartphones. The DMP class is for devices that find and render or play content on a digital media server. Typical examples of DMP devices include digital televisions, game consoles and smartphones. The DMC class is for devices that find digital media content and match them with appropriate media players or renderers. The DMR class is for devices that render or play digital media content, but do not independently find content on the network. DMC devices can be used to find content to be rendered or played on DMR devices.

Another category of device classes is mobile handheld devices (MHD). Some examples of MHD device classes are mobile digital media server (M-DMS), mobile digital media player (M-DMP), and mobile digital media controller (M-DMC). These classes share usage models with their HND counterparts (DMS, DMP and DMC, respectively), but have different media format and network requirements. Other MHD classes include mobile digital media uploader (M-DMU) and mobile digital media downloader (M-DMD). M-DMU devices can upload digital media to M-DMS devices. M-DMD devices can download digital media from M-DMS devices.

Figure 4:
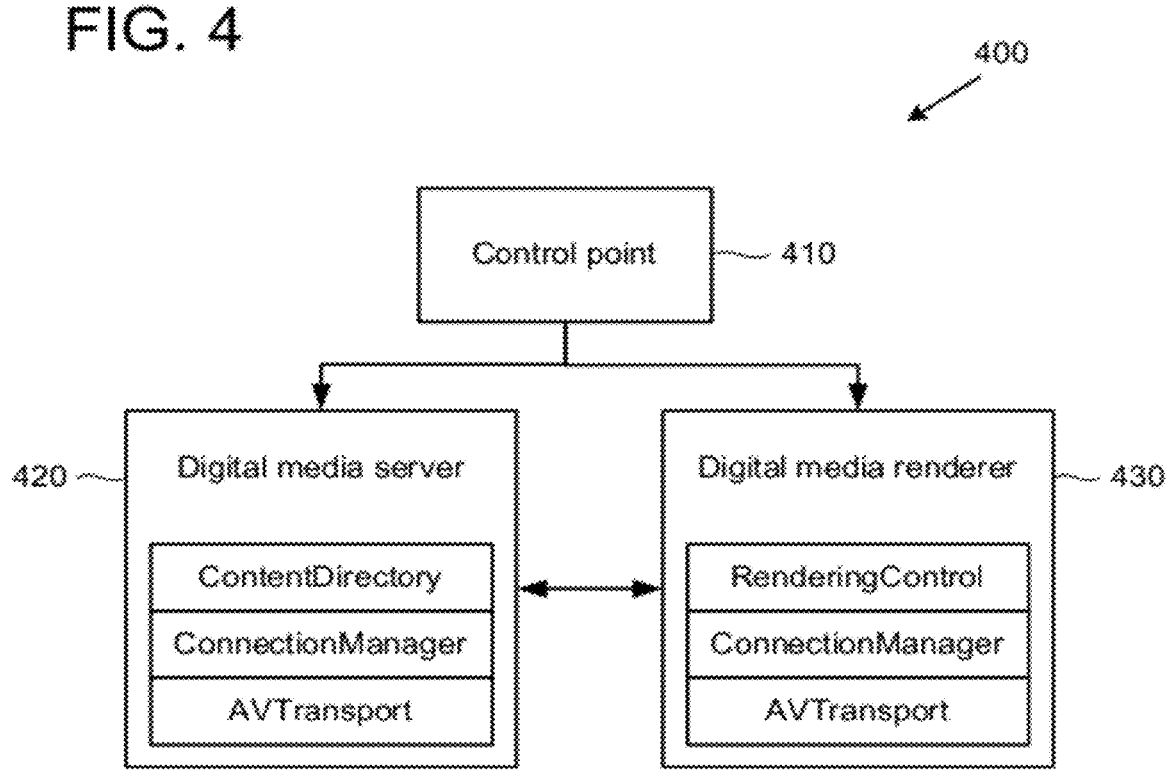
FIG. 4 is a block diagram showing an arrangement according to a UPnP AV architecture.

The device model specified in the DLNA interoperability guidelines is based on the Universal Plug and Play (UPnP) AV architecture specification. The UPnP AV architecture specification defines interaction between UPnP control points and UPnP AV devices. FIG. 4 shows an arrangement 400 according to a UPnP AV architecture. Control point 410 typically includes a user interface and coordinates interaction between digital media server (DMS) 420 and digital media renderer (DMR) 430. Control point 410 can control (e.g., through user interaction with a user interface) flow of media resource information between DMS 420 and DMR 430 using a UPnP AVTransport service. In the example shown in FIG. 4, DMS 420 also communicates directly with DMR 430. For example, DMS 420 transfers media resource information to DMR 430 using a media format and a transfer protocol (e.g., an isochronous push transfer protocol such as IEC61883/IEEE1394 for real-time transfer, or an asynchronous pull transfer protocol such as HTTP GET) supported by DMS 420 and DMR 430. DMS 420 and/or DMR 430 can send event notifications (e.g., event notifications relating to the state of the DMR 430 as it plays the media resource) back to control point 410.

Control point 410, DMS 420 and DMR 430 can each be embodied in different devices (e.g., a remote control, DVR and digital television, respectively), or two or more of the control points, DMSs and DMRs can be embodied in the same device. For example, a PC with a graphical user interface (GUI) can include control point 410 and DMS 420. A user can interact with the GUI on the PC to select digital video to be played, and to select a digital television that acts as the DMR 430 to play the selected video. Alternative arrangements also are possible. For example, arrangement 400 can include multiple control points, multiple digital media servers, and/or multiple digital media renderers, or other types of components.

E. Exemplary Streaming Protocol

DLNA interoperability guidelines draw on industry standards developed and managed by other organizations. For example, DLNA interoperability guidelines require DLNA-compliant devices to have a network connection (e.g., Ethernet, BlueTooth, WiFi) that uses TCP/IP, which is maintained by the Internet Engineering Task Force (IETF). For streaming of media content, DLNA interoperability guidelines specify a protocol maintained by the Universal Plug and Play (UPnP) Forum. DLNA devices typically handle some standardized media formats (e.g., JPEG, MPEG-2) by default, while other digital media formats are optional.

In examples described herein, an exemplary protocol that can be used to stream media content to devices on a local network is specified by UPnP and used by the DLNA. However, exemplary technology described herein does not require compliance with any particular guideline or standard. For example, modified versions of exemplary services, state variables, actions or events described herein, or different services, state variables, actions or events, can be used.

In the example shown in FIG. 4, DMS 420 includes several UPnP services: ContentDirectory, ConnectionManager, and AVTransport (which is optional). The ContentDirectory service allows control point 410 to select a media resource to be played on DMR 430. The ConnectionManager service (in the context of DMS 420) allows DMS 420 to prepare and/or terminate transfer of digital media to DMR 430, such as by using the PrepareForConnection( ) and ConnectionComplete( ) actions, respectively, although actions such as PrepareForConnection( ) need not be used in exemplary technologies described herein. The AVTransport service allows control point 410 to select the desired media resource to be transferred to DMR 430 (e.g., by using the SetAVTransportURI( ) action). The AVTransport service also allows control point 410 to control playback of the media resource (e.g., by using Play( ), Stop( ), Pause( ), Seek( ) or other actions). DMR 430 also includes several UPnP services: RenderingControl, ConnectionManager, and AVTransport. DMR 430 can include multiple instances of these services (e.g., to support rendering of more than one media resource at the same time). The ConnectionManager service (in the context of DMR 430) allows DMR 430 to enumerate supported transfer protocols and media formats using the GetProtocolInfo( ) action. The ConnectionManager service also allows DMR 430 to prepare for receiving media resource information from DMS 420 and/or terminate a connection, such as by using the PrepareForConnection( ) and ConnectionComplete( ) actions, respectively, although actions such as PrepareForConnection( ) need not be used in exemplary technologies described herein. The RenderingControl service allows control point 410 to control the rendering of a media resource at DMR 430. Alternative arrangements also are possible. For example, DMS 420 and/or DMR 430 can include different combinations of services, such as a combination that omits the AVTransport service from DMS 420.

1. AVTransport Service

This section provides further details of the AVTransport service, including AVTransport state variables and AVTransport actions.

a. AVTransport State Variables

This section describes exemplary state variables for the AVTransport service.

The TransportState variable is a string that indicates whether the media resource associated with the AVTransport instance is playing, stopped, etc. Exemplary values for TransportState include STOPPED, PLAYING, TRANSITIONING, PAUSED_PLAYBACK, PAUSED_RECORDING, RECORDING and NO_MEDIA_PRESENT.

The TransportStatus variable is a string that indicates whether asynchronous errors (e.g., network congestion, server errors, etc.) have occurred during operation of the AVTransport service. Exemplary values for TransportStatus include ERROR_OCCURRED and OK.

The TransportPlaySpeed variable is a string representation of a fraction that indicates playback speed relative to normal speed. Exemplary values for TransportPlaySpeed include "1" (normal speed), "½" (half of normal speed), etc.

The AVTransportURI variable is a uniform resource identifier (URI) of the media resource that corresponds to the AVTransport instance. AVTransportURI also allows a control point to obtain metadata for the media resource.

The LastChange variable is a string that allows receipt of event notifications when the state of the AVTransport instance changes. LastChange contains a list of pairs (e.g., <AVTransport instance ID>, <state variable>=<new value>) that indicate the respective state changes.

Other AVTransport state variables include PlaybackStorageMedium, RecordStorageMedium, PossiblePlaybackStorageMedia, PossibleRecordStorageMedia, CurrentPlayMode, TransportPlaySpeed, RecordMediumWriteStatus, CurrentRecordQualityMode, PossibleRecordQualityModes, NumberOfTracks, CurrentTrack, CurrentTrackDuration, CurrentMediaDuration, CurrentTrackMetaData, CurrentTrackURI, AVTransportURIMetaData, NextAVTransportURI, NextAVTransportURIMetaData, RelativeTimePosition, AbsoluteTimePosition, RelativeCounterPosition, AbsoluteCounterPosition, CurrentTransportActions, A_ARG_TYPE_SeekMode, A_ARG_TYPE_SeekTarget, and A_ARG_TYPE_InstanceID.

b. AVTransport Actions

This section describes exemplary actions for the AVTransport service.

The SetAVTransportURI( ) action specifies the URI of a media resource (e.g., a video resource) corresponding to the AVTransport instance. Input arguments for SetAVTransportURI( ) include InstanceID (which corresponds to A_ARG_TYPE_InstanceID), CurrentURI (which corresponds to AVTransportURI), and CurrentURIMetaData (which corresponds to AVTransportURIMetaData). SetAVTransportURI( ) changes TransportState to STOPPED if the media resource cannot be located at the specified URI, or if the current value of TransportState is NO_MEDIA_PRESENT. If TransportState is PLAYING, SetAVTransportURI( ) may also change TransportState to TRANSITIONING, such as where buffering is occurring before actual playback begins, before returning TransportState to PLAYING.

The GetPositionInfo( ) action returns information that describes the current position of a media resource (e.g., track number, track duration, etc.) corresponding to the AVTransport instance. The input argument for GetPositionInfo( ) is InstanceID (which corresponds to A_ARG_TYPE_InstanceID). Output arguments include Track (which corresponds to CurrentTrack), TrackDuration (which corresponds to CurrentTrackDuration), TrackMetaData (which corresponds to CurrentTrackMetaData), TrackURI (which corresponds to CurrentTrackURI), RelTime (which corresponds to RelativeTimePosition), AbsTime (which corresponds to AbsoluteTimePosition), RelCount (which corresponds to RelativeCounterPosition), and AbsCount (which corresponds to AbsoluteCounterPosition).

The Stop( ) action stops playback of a current media resource corresponding to the AVTransport instance. The input argument for Stop( ) is InstanceID (which corresponds to A_ARG_TYPE_InstanceID). Stop( ) changes TransportState to STOPPED, unless the current value of TransportState is NO_MEDIA_PRESENT. Stop( ) may also cause changes in the current position of the media resource (which can be discovered using the GetPositionInfo action).

The Play( ) action starts playback of a current media resource (e.g., at a specified speed and starting position, according to a current play mode) corresponding to an AVTransport instance. The input arguments for Play( ) are InstanceID (which corresponds to A_ARG_TYPE_InstanceID) and Speed (which corresponds to TransportPlaySpeed). Play( ) changes TransportState to PLAYING and updates TransportPlaySpeed (e.g., normal speed in forward direction). Play( ) may also change TransportState to TRANSITIONING, such as where buffering is occurring before actual playback begins.

The Pause( ) action pauses playback of a current media resource corresponding to an AVTransport instance. The input argument for Pause( ) is InstanceID (which corresponds to A_ARG_TYPE_InstanceID). Pause( ) changes TransportState to PAUSED_PLAYBACK if TransportState is PLAYING or to PAUSED_RECORDING if TransportState is RECORDING when the action is performed. Pause( ) causes the media resource to remain at its current position.

The Seek( ) action moves the current position of a current media resource corresponding to an AVTransport instance to a target position. Input arguments for Seek( ) include InstanceID (which corresponds to A_ARG_TYPE_InstanceID), Unit (which corresponds to A_ARG_TYPE_SeekMode), and Target (which corresponds to A_ARG_TYPE_SeekTarget). Seek( ) temporarily changes TransportState to TRANSITIONING if TransportState is PLAYING or STOPPED when the action is performed, before returning to the previous state when the new position is reached.

Other AVTransport actions include SetNextAVTransportURI( ), GetMediaInfo( ), GetTransportInfo( ), GetDeviceCapabilities( ), GetTransportSettings( ), Record( ), Next( ), Previous( ), SetPlayMode( ), SetRecordQualityMode( ), and GetCurrentTransportActions( ).

2. ConnectionManager Service

This section provides further details of the ConnectionManager service, including ConnectionManager state variables and ConnectionManager actions.

ConnectionManager state variables include SourceProtocolInfo, SinkProtocolInfo, CurrentConnectionIDs, A_ARG_TYPE_ConnectionStatus, A_ARG_TYPE_ConnectionManager, A_ARG_TYPE_Direction, A_ARG_TYPE_ProtocolInfo, A_ARG_TYPE_ConnectionID, A_ARG_TYPE_AVTransportID, and A_ARG_TYPE_RcsID.

The GetProtocolInfo( ) action returns protocol-related information for protocols supported by an instance of ConnectionManager. Output arguments for GetProtocolInfo( ) can include Source (which corresponds to SourceProtocolInfo), and Sink (which corresponds to SinkProtocolInfo).

Other ConnectionManager actions include PrepareForConnection( ), ConnectionComplete( ), GetCurrentConnectionIDs( ), and GetCurrentConnectionInfo( ).

3. RenderingControl Service

This section provides further details of the RenderingControl service, including RenderingControl state variables and RenderingControl actions.

The LastChange variable is a string that conforms to an XML schema and allows receipt of event notifications when the state of the device (as indicated by the state of a RenderingControl instance) changes. The Mute variable is a Boolean value that represents the current "mute" setting of an associated audio channel (with TRUE indicating that the channel has been muted). The Volume variable is an unsigned integer value that represents a current volume level (with 0 representing silence) of an associated audio channel.

Other RenderingControl state variables include PresetNameList, Brightness, Contrast, Sharpness, RedVideoGain, GreenVideoGain, BlueVideoGain, RedVideoBlackLevel, GreenVideoBlackLevel, BlueVideoBlackLevel, ColorTemperature, HorizontalKeystone, VerticalKeystone, VolumeDB, Loudness, A_ARG_TYPE_Channel, A_ARG_TYPE_InstanceID, and A_ARG_TYPE_PresetName.

The SetMute( ) action sets the Mute state variable of a RenderingControl instance and audio channel. Input arguments include InstanceID (which relates to A_ARG_TYPE_InstanceID), Channel (which relates to A_ARG_TYPE_Channel), and DesiredMute (which relates to the Mute state variable).

The SetVolume( ) action sets the Volume state variable of a corresponding RenderingControl instance and audio channel. Input arguments include InstanceID (which relates to A_ARG_TYPE_InstanceID), Channel (which relates to A_ARG_TYPE_Channel), and DesiredVolume (which relates to the Volume state variable).

Other RenderingControl actions include ListPresets( ), SelectPreset( ), GetMute( ), GetVolume( ), GetVolumeDB( ), SetVolumeDB( ), GetVolumeDBRange( ), GetLoudness( ), SetLoudness( ), and "Get" and "Set" actions for display-related state variables (e.g., Brightness, Contrast, Sharpness, RedVideoGain, etc.).

F. Exemplary Codecs and File Formats

Exemplary digital content can include digital video, digital audio, and digital still images.

Digital video described herein can be represented in a variety of formats (e.g., MPEG-2, MPEG-4, H.264/AVC, VC-1, and/or other formats) for raw, uncompressed video data or compressed video data. Some video formats are specified by international standards. For example, the VC-1 standard sets forth requirements for decoders to decode video encoded in a VC-1 format. A VC-1-compliant encoder and decoder ("codec") can typically provide high-quality video with good compression efficiency. Described techniques and tools can handle standard-definition video or high-definition video, 2-D or 3-D video, etc.

Digital audio described herein can be represented in a variety of file formats (e.g., WAV, MP3, AAC, WMA, and/or other formats) for raw, uncompressed audio data or compressed audio data. Some audio formats are specified by international standards. For example, the WMA standards set forth requirements for decoders to decode video encoded in a WMA format (e.g., WMA, WMA Pro, WMA Lossless, etc.) A WMA-compliant encoder and decoder ("codec") can typically provide high-quality audio with good compression efficiency. Described techniques and tools can handle audio having different sample rates, channel configurations, etc.

Digital images described herein can be color, grey-scale, or other types of images, and can be represented in a variety of file formats (e.g., GIF, PNG, BMP, TIFF, TIFF Float32, JPEG, JPEG XR, and/or other formats) for raw, uncompressed image data or compressed image data. For example, described techniques and tools can handle standard dynamic range (SDR) images in an SDR format such as JPEG, or high dynamic range (HDR) images in an HDR format such as PEG XR. Some image formats are specified by international standards. For example, the JPEG XR standard sets forth requirements for decoders to decode images encoded in JPEG XR format. A JPEG XR-compliant encoder and decoder ("codec") can typically provide high-quality images with good compression efficiency. The Exchangeable Image File ("EXIF") format specifies a structure for image files. Image data in an EXIF file can be compressed (e.g., in JPEG format). Alternatively, image data in an EXIF file can be uncompressed (e.g., in TIFF format).

II. Detailed Examples

This section describes detailed examples of technology described herein. Described examples implement features such as translation and local/remote playback switching. Described examples can allow playback of digital content at remote devices while shielding content providers from the intricacies of described streaming protocols. For web developers, content providers, and others, allowing remote playback of content can be as simple as inserting a <video> or <audio> tag in HTML code, when performed in accordance with technologies described herein. Technologies described herein can be used in combination with customizations such as scripts (e.g., JavaScript scripts) and cascading style sheets (CSS).

A. Exemplary Audio and Video Elements

This section describes detailed examples of media elements (e.g., audio and video elements) and related features, interfaces and arrangements.

Figure 5:
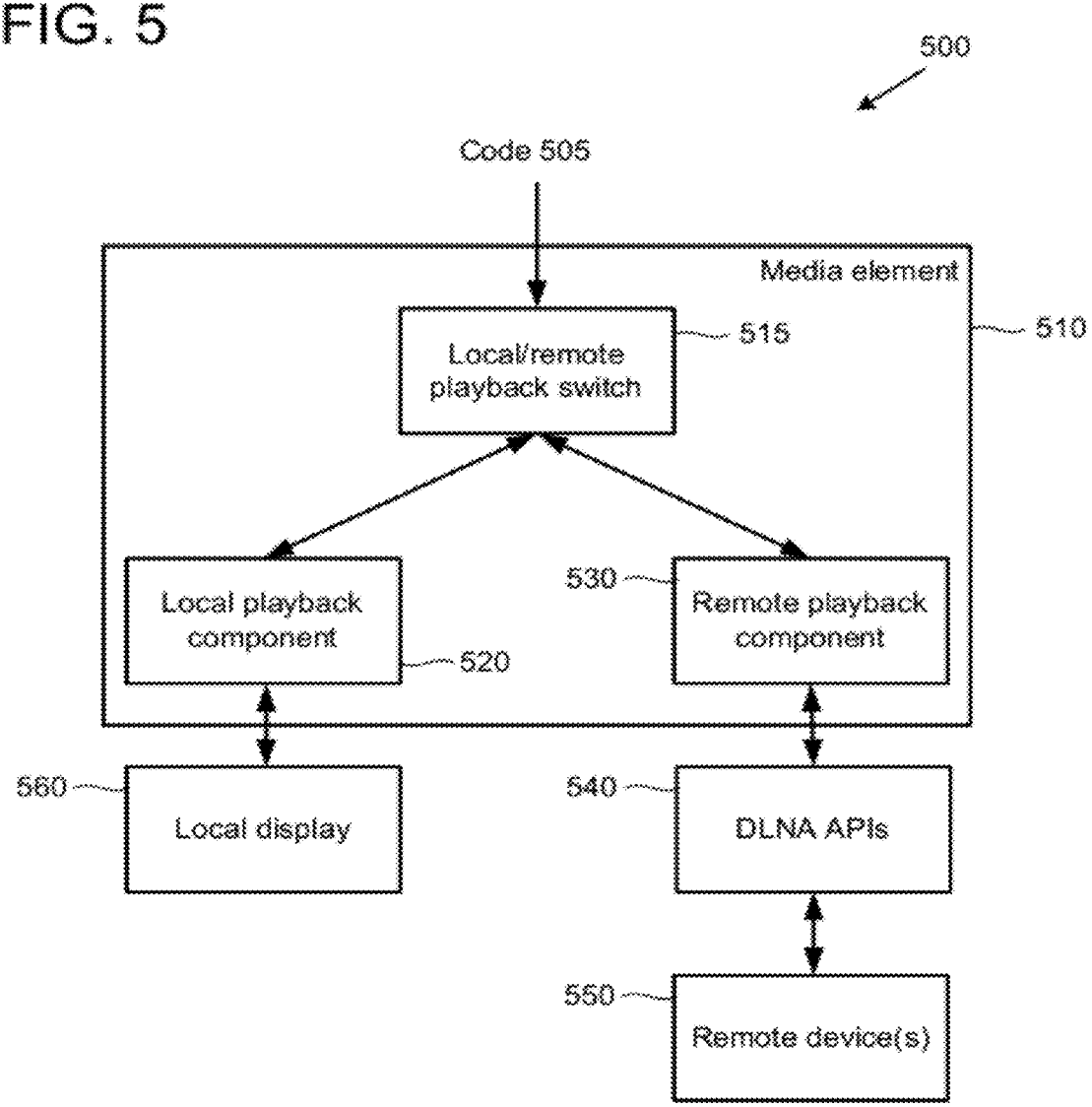
FIG. 5 is a block diagram showing an exemplary arrangement comprising a media element with local/remote playback switching functionality, a local playback component, and a remote playback component.

FIG. 5 is a block diagram showing an exemplary arrangement 500 comprising a media element 510 with local/remote playback switch 515, local playback component 520 and remote playback component 530. Remote playback component 530 (also referred to as "SharingEngine") implements remote playback of media resources. Remote playback component 530 also can act as a translation layer, facilitating streaming to remote device(s) 550 for rendering and output. In the example shown in FIG. 5, remote playback component 530 uses DLNA application programming interfaces (APIs) 540 to communicate with remote device(s) 550 for remote playback. Local playback component 520 (also referred to as "MediaEngine") implements local playback of media resources, and can cause media resources to be rendered and output on a local display device 560 (e.g., for a video resource).

Media element 510 receives code 505. Code 505 can include a script that is not aware of the potential for remote playback of a media resource. In order for a transition between local and remote playback to be transparent to scripts not aware of remote playback, an extra level of indirection can be added between the script and the components implementing playback. Accordingly, media element 510 has a local/remote playback switch 515 between local playback component 520 and remote playback component 530. Local playback component 520 and remote playback component 530 can implement a common interface. Using a common interface for both local and remote playback allows smooth transitions from local playback to remote playback, and vice versa. Playback state (e.g., current position, playback speed, volume, etc.) can be preserved in such a transition. In the example shown in FIG. 5, only one component is active at a time. However, when a switch happens, the playback state of the element can be preserved by reading attributes from the current playback component and setting them on the new playback component. For example, the following attributes (from the HTMLMediaElement interface) can be read on a local playback component and then set on a remote playback component: preload, defaultPlaybackRate, playbackRate, autoplay, loop, muted, volume, currentTime, paused, and src. Source elements, representing the media resources, also can be transferred from one component to the other during a switch.

Media element 510 can perform device selection (e.g., when more than one device is available for remote playback) based on information that describes remote devices available for remote playback. For example, remote playback component 530 can provide a list of remote devices and/or other data structures to manage selection of and playback to remote device(s) 550.

Scripts which are aware of remote playback capabilities can subscribe to custom device connection and disconnection events (e.g., msConnected and msDisconnected events) to be notified of switching between local and remote playback. Media element 510 can be, for example, a feature of the Trident rendering engine functionality for Microsoft Internet Explorer that is available via the MSHTML.dll dynamic link library.

Alternatively, another arrangement for media elements can be used. For example, components that act as translation layers or local/remote switches can be implemented outside media elements.

1. Loading, Startup and Shutdown

A media resource can be provided by a server and indicated by a single URI or a set of URIs stored as source elements. During loading, a byte stream (which can be referred to as an "original byte stream") can be opened between a local computing device and the server providing the media resource. Opening the original byte stream on the local computing device can have advantages, such as providing accurate values for time ranges (e.g., via the buffered attribute of an HTMLMediaElement interface, as shown in Table 4, below). A streaming protocol feature allows URIs to be sent directly to remote devices, but without supporting transfer of HTTP headers to the remote device, and in described examples this feature is not relied upon for streaming content.

The original byte stream can be parsed in part to determine codec parameters and extract metadata for the media resource. Based on this information and a call to ConnectionManager::GetProtocolInfo( ), a media element can determine whether encoded media data in the byte stream can be decoded by a remote device or if transcoding is needed. In either case, another byte stream (which can be referred to as a "proxied byte stream") can be opened between the local computing device and the remote device. The proxied byte stream can be created, for example, by opening a port on the local computing device and calling AVTransport::SetAVTransportURI( ) on the remote device with the URI of the local port and the metadata of the proxied byte stream.

Figure 6:
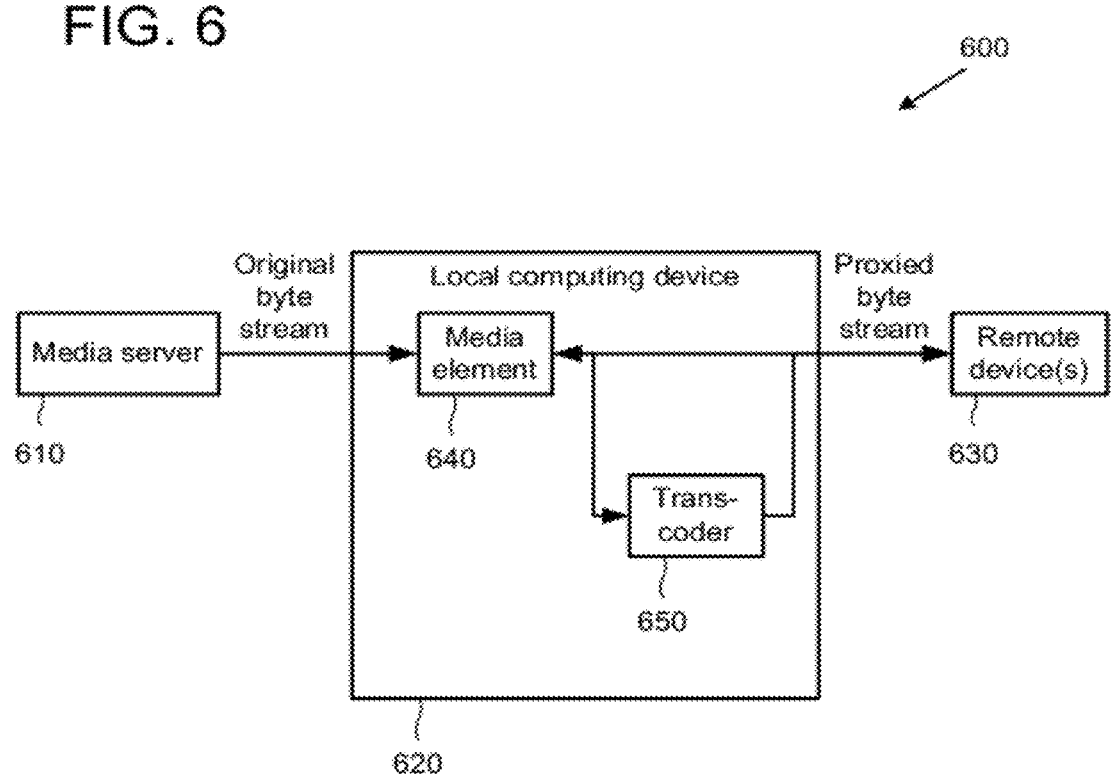
FIG. 6 is a block diagram showing an exemplary arrangement comprising an original byte stream and a proxied byte stream for communication with one or more remote devices, in which optional transcoding can be performed on encoded media content.

FIG. 6 is a block diagram showing an exemplary arrangement 600 in which media element 640 resides on a local computing device 620 in communication with media server 610 and remote device(s) 630. In the example shown in FIG. 6, if transcoding is needed to prepare encoded media content for decoding at remote device(s) 630, transcoder 650 performs transcoding by decoding encoded media content in a first format, then re-encoding the media content in a second format supported by a remote device. Transcoding can be performed according to one or more of a variety of existing transcoding techniques. Data from the original byte stream can be cached on the local computing device 620 and served to remote device(s) 630 via the proxied byte stream, bypassing transcoder 650 if transcoding is not needed. Alternative arrangements also are possible. For example, if transcoding is not needed, transcoder 650 can be omitted.

When a remote connection is started, the media element can subscribe to change events (e.g., LastChange events) fired by AVTransport and RenderingControl services provided by the remote device. When the media element is shut down, it can unsubscribe from these services and call AVTransport::Stop( ) on the remote device to end playback.

Alternatively, other arrangements and techniques for media element loading, startup, and shutdown can be used.

2. Exemplary Translations for Media Element Interface

For media elements (e.g., audio elements or video elements), exemplary translations relating to the HTMLMediaElement interface are shown in Tables 4-7, below. In Tables 4-7 some methods or attributes of the HTMLMediaElement interface are not translated (indicated by "n/a"). Some translations in Tables 4-7 involve translated code (e.g., a call to the src attribute leads to a call to AVTransport::SetAVTransportURI( ), while other translations involve other interpretations (e.g., a call to the buffered attribute is interpreted as measuring an amount of data buffered in an original byte stream, rather than a proxied byte stream). Calls to interfaces such as HTMLVideoElement, HTMLElement and HTMLSourceElement do not directly affect the streaming protocol and need not be translated. Alternatively, different translations, more or fewer translations, or different combinations of translations can be used.

Exemplary translations relating to network state are shown in Table 4, below.

TABLE 4

Exemplary translations relating to network state.

| Call to HTMLMediaElement interface | Translation |
|---|---|
| attribute DOMString src | Setting this attribute starts a loading process, which triggers a call to AVTransport::SetAVTransportURI(). |
| readonly attribute DOMString currentSrc | n/a |
| readonly attribute unsigned short networkState | n/a |
| attribute DOMString preload | n/a |
| readonly attribute TimeRanges buffered | Amount of data buffered by the original byte stream, rather than the proxied byte stream. |
| void load() | Triggers a loading process, which triggers a call to AVTransport::SetAVTransportURI(). |
| DOMString canPlayType (in DOMString type) | Returns the string "probably" if the media can be transcoded to a format the device supports, or the empty string otherwise. |

Exemplary translations relating to playback are shown in Table 5, below.

TABLE 5

Exemplary translations relating to playback.

| Call to HTMLMediaElement interface | Translation |
|---|---|
| attribute double currentTime | AVTransport::GetPositionInfo() is called at regular intervals and returns RelTime as the current time. In between those calls, the currentTime value is interpolated linearly using the local system time. When setting the attribute, AVTransport::Seek() is called on the device. |
| readonly attribute double initialTime | n/a |
| readonly attribute double duration | This attribute contains the TrackDuration calue returned by calls to AVTransport::GetPositionInfo(). |
| readonly attribute Date startOffsetTime | n/a |
| readonly attribute boolean paused | n/a |
| attribute double defaultPlaybackRate | n/a |
| attribute double playbackRate | n/a |
| readonly attribute TimeRanges played | The time range is updated based on RelTime value returned by calls to AVTransport::GetPositionInfo(). |
| readonly attribute TimeRanges seekable | n/a |
| readonly attribute boolean ended | n/a |
| attribute boolean autoplay | n/a |
| attribute boolean loop | n/a |
| void play() | AVTransport::Play() is called on the device, possibly preceded by AVTransport::SetAVTransportURI() if the media was not loaded before. |

TABLE 5-continued

Exemplary translations relating to playback.

| Call to HTMLMediaElement interface | Translation |
|---|---|
| void pause() | AVTransport::Pause() is called on the device, possibly preceded by AVTransport::SetAVTransportURI() if the media was not loaded before. |

Exemplary translations relating to user controls are shown in Table 6, below.

TABLE 6

Exemplary translations of attributes relating to user controls.

| Attribute of HTMLMediaElement Interface | Translation |
|---|---|
| attribute boolean controls | n/a |
| attribute double volume | When set, the value is multiplied by 100 and RenderingControl::SetVolume() is called. |
| attribute boolean muted | When set, RenderingControl::SetMute() is called. |

Table 7, below, shows two other attributes from the HTMLMediaElement interface—the readyState attribute and the seeking attribute. In the example shown in Table 7, no specific translations are used that relate to the readyState attribute or the seeking attribute.

TABLE 7

Exemplary treatment of readyState attribute and seeking attribute.

| Call to HTMLMediaElement interface | Translation |
|---|---|
| readonly attribute unsigned short readyState | n/a |
| readonly attribute boolean seeking | n/a |

3. Exemplary Translations of Streaming Protocol Events

During playback at a remote device, a user can perform actions to control playback. A user may, for example, use a digital television's remote control to stop playback on the digital television, which can generate one or more streaming protocol events. Streaming protocol events can be translated into scripting events and/or markup language events. Such translations can help to keep the state of a local media player and a remote device consistent.

Exemplary translations for streaming protocol events are shown in Table 8, below. Alternatively, different translations, more or fewer translations, or different combinations of translations can be used.

TABLE 8

Exemplary translations of streaming protocol events.

| Streaming protocol event | Translation (HTML5 event name) |
|---|---|
| State of original byte stream. | progress |
| AVTransport::LastChange is received with value TransportStatus = ERROR_OCCURRED. In that case, the error state of the element is set to MEDIA_ERR_DECODE. | error |
| State of original byte stream. | stalled |
| Before AVTransport::Play() is called. | play |
| AVTransport::Pause() completes or AVTransport::LastChange is received with TransportState = STOPPED (if looping) or TransportState = PAUSED_PLAYBACK | |
| AVTransport::Play() completes or AVTransport::LastChange is received with TransportState = PLAYING | playing |
| Before AVTransport::Seek() is called. | seeking |
| AVTransport::Seek() completes. | seeked |
| RelTime value returned by calls to AVTransport::GetPositionInfo() changes.41 | timeupdate |
| AVTransport:::astChange is received with TransportState = STOPPED and the playback is not looping. | ended |
| AVTransport::LastChange is received with a new value for TransportPlaySpeed. The element playback rate is set to this value. | ratechange |
| AVTransport::LastChange is received with a new value for TrackDuration. The element duration is set to this value. | durationchange |
| RenderingControl::LastChange is received with a new value for either Mute or Volume. | volumechange |

B. Exemplary Image Elements

This section describes detailed examples of image elements and related features, interfaces and arrangements.

Figure 7:
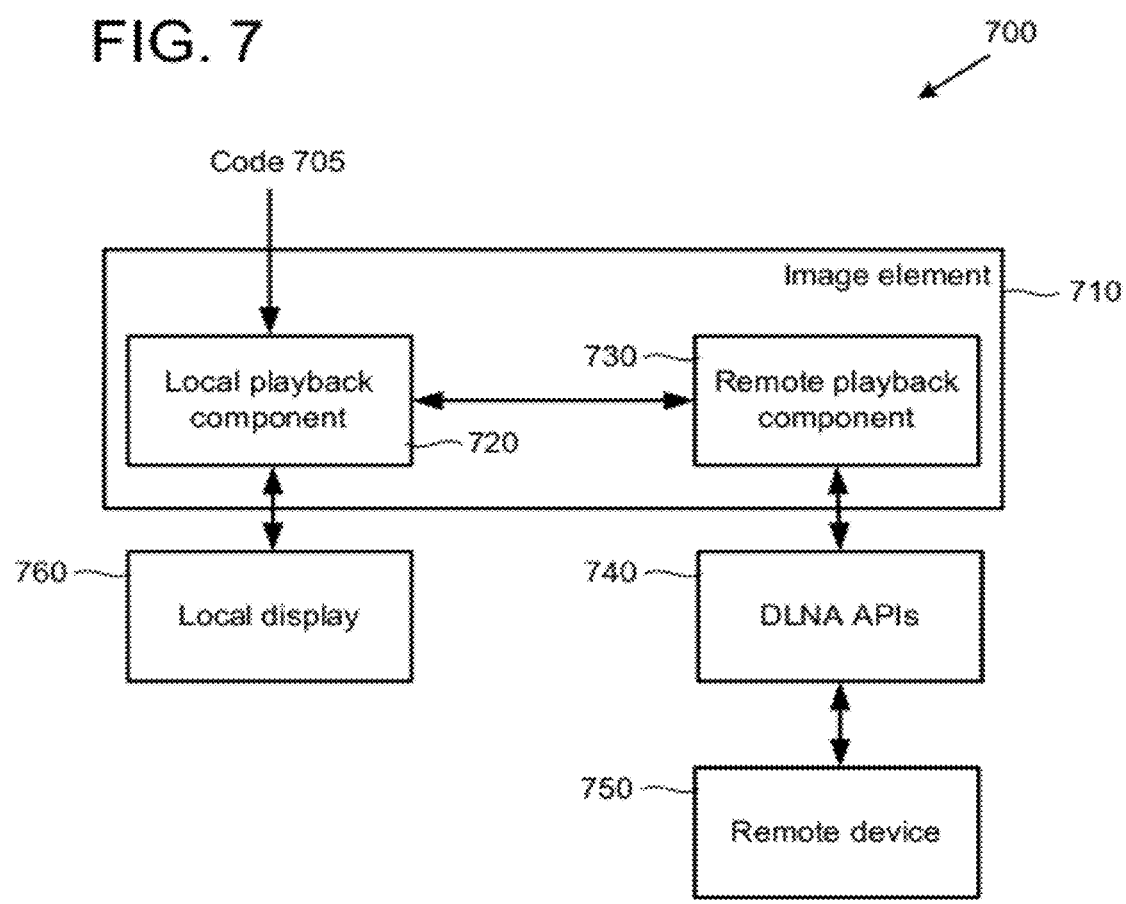
FIG. 7 is a block diagram showing an exemplary arrangement comprising an image element with a local playback component and a remote playback component.

FIG. 7 is a block diagram showing an exemplary arrangement 700 comprising an image element 710 with local playback component 720 and remote playback component 730. Remote playback component 730 implements remote playback of image resources. Remote playback component 730 also can act as a translation layer, facilitating streaming to remote device(s) 750 for rendering and output. In the example shown in FIG. 7, remote playback component 730 uses DLNA application programming interfaces (APIs) 740 to communicate with remote device(s) 750 for remote playback. Local playback component 720 implements local display of images, and can cause such images to be rendered and output on a local display device 760.

Local playback component 720 can cause an image resource to be displayed at a local display device 760 at the same time that remote playback component 730 is causing the image resource to be displayed at a remote device. Alternatively, the image resource can be displayed at one location at a time, or at more than two locations. Transfer of playback state between local playback component 720 and remote playback component 730 is not needed. Image element 710 receives code 705. Code 705 can include a script that may or may not be aware of the potential for remote playback. A transition between local playback and remote playback can be transparent to a caller, although custom device connection and disconnection events (e.g., msConnected and msDisconnected events) can still be fired to indicate when connections are made and terminated.

Alternatively, another arrangement for image elements can be used. For example, components that act as translation layers can be implemented outside image elements.

1. Loading, Startup, and Shutdown

For image elements, the loading process is similar to the loading process described for audio elements and video elements, above. An image resource can be provided by a server and indicated by a single URI or a set of URIs. During loading, a byte stream (which can be referred to as an "original byte stream") can be opened between a local computing device and a server providing the image resource. The original byte stream can be parsed in part to determine codec parameters and extract metadata. Based on this information and a call to ConnectionManager::GetProtocolInfo( ), the image element can determine whether encoded data in the byte stream can be decoded by a remote device or if transcoding is needed. In either case, another byte stream (which can be referred to as a "proxied byte stream") can be opened between the local computing device and the remote device. The proxied byte stream can be created by opening a port on the local machine and calling AVTransport::SetAVTransportURI( ) on the remote device with the URI of the local port and the metadata of the proxied bytestream.

Because images do not exhibit dynamic playback behavior like video and audio, on startup image elements can omit listening for LastChange events and can omit calling actions such as AVTransport::Stop( )(e.g., during shutdown) on the remote device.

2. Exemplary Translations for Image Element Interface

For image elements, exemplary translations relating to the HTMLImageElement interface are shown in Table 9, below. In the examples shown in Table 9, no specific translations are used (indicated by "n/a" in the table) for several attributes of the HTMLImageElement interface. In described examples, calls to interfaces that do not directly affect the streaming protocol (such as calls to HTMLElement) are not translated, and streaming protocol events are also not translated for image elements. Alternatively, different translations, more or fewer translations, or different combinations of translations can be used.

TABLE 9

Exemplary translations relating to the HTMLImageElement interface.

| Attribute of HTMLImageElement interface | Translation |
|---|---|
| attribute DOMString alt | n/a |
| attribute DOMString src | Setting this attribute triggers a loading process, which triggers a call to AVTransport::SetAVTransportURI(). |
| attribute DOMString useMap | n/a |
| attribute boolean isMap | n/a |
| attribute unsigned long width | n/a |
| attribute unsigned long height | n/a |
| readonly attribute unsigned long naturalWidth | n/a |
| readonly attribute unsigned long naturalHeight | n/a |
| readonly attribute boolean complete | n/a |

C. Exemplary Extensions for Image, Audio, and Video Elements

This section describes exemplary extensions that can be implemented on image, audio, and video elements. Such extensions can allow scripts to control connections of such elements to remote devices and to obtain information about such connections. For example, extensions that comply with the HTML5 standard are described that can provide more control over playback experience. Events (e.g., msConnected and msDisconnected events) sent to servers that provide web pages can indicate switches between local and remote playback. Methods (e.g., JavaScript methods) can be used to connect to and disconnect from remote devices, test whether playback is local or remote, and transfer connections between audio and video elements to allow pre-buffering and faster transitions between pieces of media. Faster transitions can allow smoother operation of features such as playlists and smoother transitions between media segments (e.g., smoother transitions between commercial segments and other segments in video).

In described examples, a read only msPlayTo attribute is added to an interface of an element. The msPlayTo attribute returns an IPlayTo interface. Exemplary methods and attributes of the IPlayTo interface are described in Table 10, below.

TABLE 10

Exemplary methods and attributes of the IPlayTo interface.

| Method/Attribute | Description |
| --- | --- |
| bool connect (in optional device) | Connect element to a remote device. The optional device parameter identifies the device to connect to. If absent, a user interface can be displayed to let a user choose a devidce to connect to. If present, the connection can be established without prompting a user. The device parameter can be a string containing a Unique Device Name (UDN) or an object returned by the device attribute on the same interface. The method returns TRUE if the connection succeeds. |
| void disconnect() | Disconnects element from a remote device. |
| readonly attribute bool connected | Returns TRUE if the element is currently connected to a remote device. |
| readonly attribute IPlayToDevice device | Returns an object storing information about the connection. |

Exemplary attributes of the IPlayToDevice are shown in Table 11, below.

TABLE 11

Exemplary attributes of the IPlayToDevice interface.

| Attribute | Description |
| --- | --- |
| readonly attribute string friendlyName | A name of the device which can be displayed to the user. |
| readonly attribute string manufacturer | The device manufacturer. |
| readonly attribute string model | The device model. |
| readonly attribute string iconURI | A URI to an icon representing the device. This URI can be set (e.g., on an image element) for display. |

Described technologies can increase security of computing devices and networks by removing the need for installing plugins of unknown origin, while still controlling what remote servers that provide content via web pages can do with remote devices, so that users can remain in control.

III. Exemplary User Interface

Figure 8:
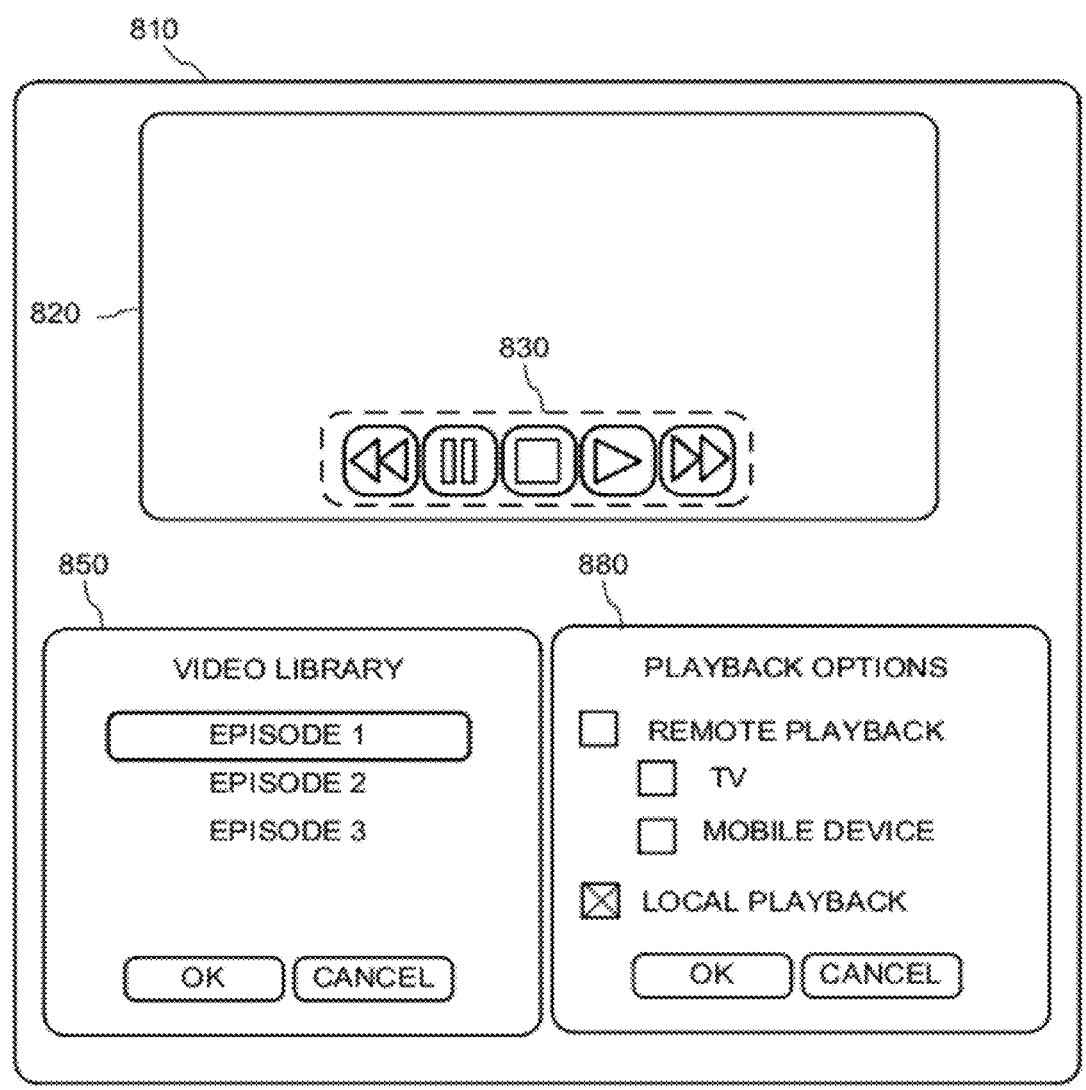
FIG. 8 is a diagram of an exemplary user interface that can be used to switch between local and remote playback of digital content.

This section describes exemplary approaches to user interaction. FIG. 8 shows an example user interface 810. User interface 810 can be used to switch seamlessly between local and remote playback of content (e.g., content provided by a media server over the Internet via a web page). Local playback can include playback at a local computing device. Remote playback can include playback at a remote device that communicates with the local computing device via a local network such as an Ethernet network, Wi-Fi network, or other network covering a small geographic area such as a home or office. Allowing a user to switch seamlessly between local playback and remote playback can provide user experience advantages, such as the ability to preview streaming video on a local computing device (e.g., a laptop PC) and then switch without interruption to viewing on a remote device with a larger screen, such as a high-definition, wide-screen television. For example, user interface 810 includes a local/remote playback selection window 880 with check-box and button controls that can be used to select local or remote playback, and, if remote playback is selected, to select a remote device (e.g., "TV" or "MOBILE DEVICE"). User interface 810 also includes a playback window 820 comprising playback controls 830 for viewing and controlling playback, and a library window 850 for selecting video content (e.g., "EPISODE 1," "EPISODE 2," or "EPISODE 3") to be played. User interface 810 can simplify the user experience by allowing remote playback and local playback to be initiated from the same user interface. Alternatively, a user interface can have more or fewer features, or different combinations of features.

Figure 9:
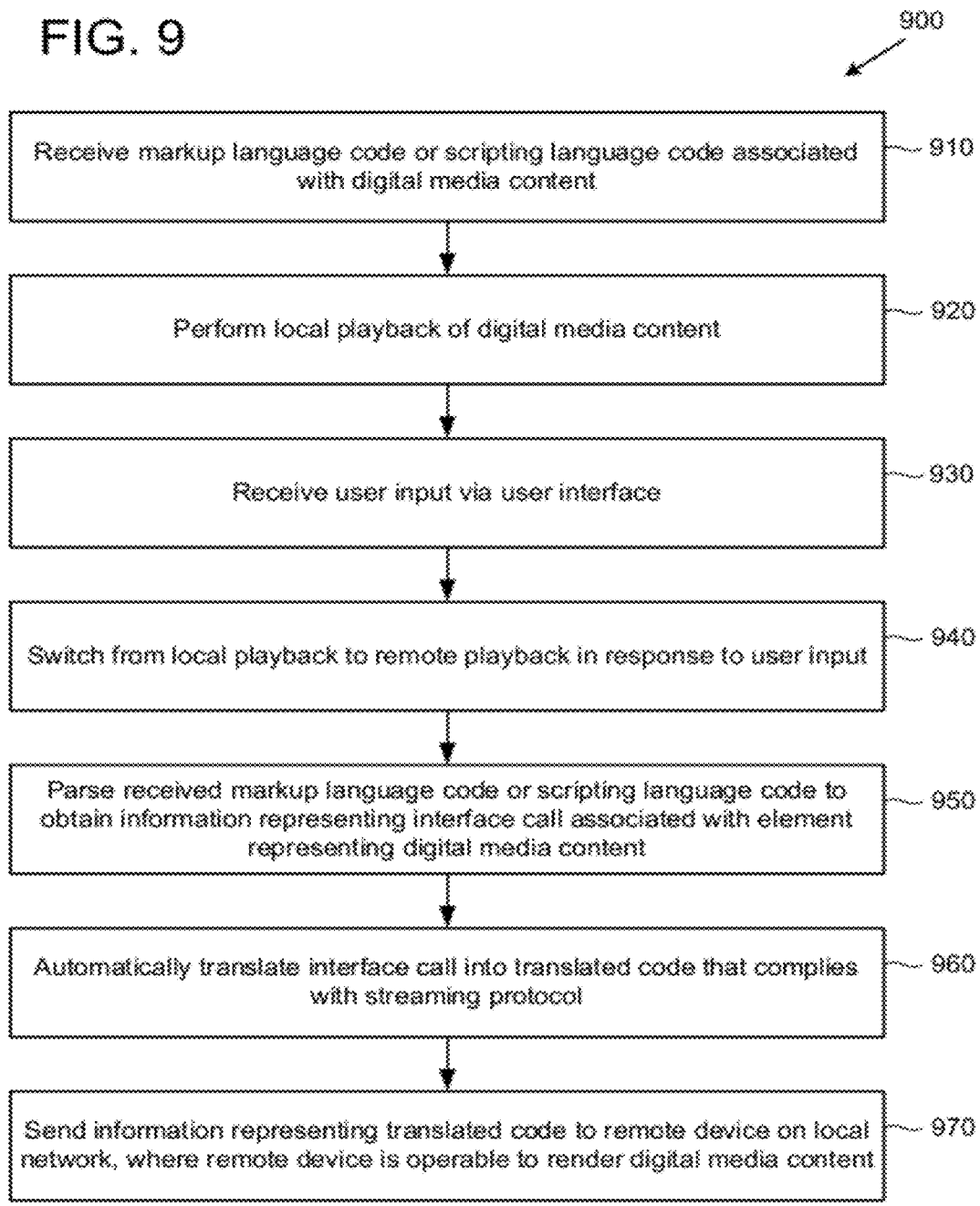
FIG. 9 is a flowchart of an exemplary technique for switching between local and remote playback of digital media content responsive to user input.

FIG. 9 shows an exemplary technique 900 for switching from local playback to remote playback in response to user input. A system that implements a user interface such as user interface 810 or other system performs the technique 900.

At 910, the system receives markup language code or scripting language code associated with digital media content. At 920, the system performs local playback of the digital media content. At 930, the system receives user input via a user interface (e.g., user interface 810). At 940, the system switches from local playback to remote playback in response to the user input. At 950, in response to the switching, the system parses received markup language code or scripting language code to obtain information representing an interface call associated with an element (e.g., a media element that implements an HTMLMediaElement interface) representing the digital media content. At 960, the system automatically translates the interface call into translated code that complies with a streaming protocol (e.g., a UPnP protocol specified by DLNA). At 970, the system sends information representing translated code to a remote device on a local network. The remote device is operable to render the digital media content.

IV. Exemplary Computing Environment

Figure 10:
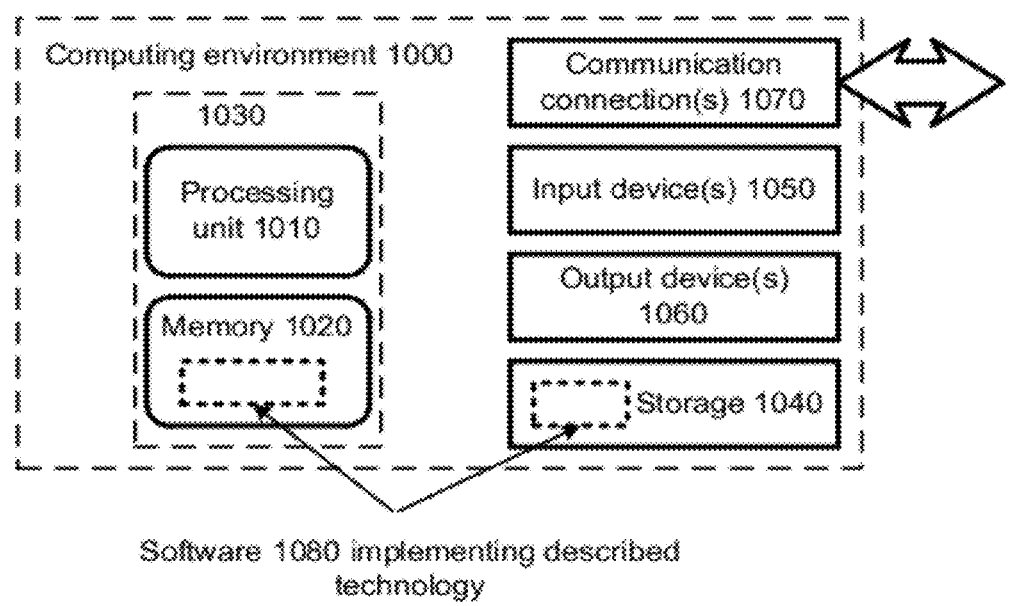
FIG. 10 is a block diagram of an exemplary computing environment suitable for implementing technologies described herein.

FIG. 10 illustrates a generalized example of a suitable computing environment 1000 in which the described technologies can be implemented. The computing environment 1000 is not intended to suggest any limitation as to scope of use or functionality, as the technologies may be implemented in diverse general-purpose or special-purpose computing environments.

With reference to FIG. 10, the computing environment 1000 includes at least one processing unit 1010 coupled to memory 1020. In FIG. 10, this basic configuration 1030 is included within a dashed line. The processing unit 1010 executes computer-executable instructions. In a multi-processing system, multiple processing units execute computer-executable instructions to increase processing power. The memory 1020 may be non-transitory memory, such as volatile memory (e.g., registers, cache, RAM), non-volatile memory (e.g., ROM, EEPROM, flash memory, etc.), or some combination of the two. The memory 1020 can store software 1080 implementing any of the technologies described herein.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other non-transitory computer-readable media which can be used to store information and which can be accessed within the computing environment 1000. The storage 1040 can store software 1080 containing instructions for any of the technologies described herein.

The input device(s) 1050 may be a touch input device such as a keyboard, touchscreen, mouse, pen, or trackball, a voice input device, a scanning device, or another device that provides input to the computing environment 1000. The output device(s) 1060 may be a display, printer, speaker, CD- or DVD-writer, or another device that provides output from the computing environment 1000. Some input/output devices, such as a touchscreen, may include both input and output functionality.

The communication connection(s) 1070 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., non-transitory computer-readable storage media or other tangible media). Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., non-transitory computer-readable storage media or other tangible media). Such instructions can cause a computer to perform the method. The technologies described herein can be implemented in a variety of programming languages.

Any of the methods described herein can be implemented by computer-executable instructions stored in one or more non-transitory computer-readable storage devices (e.g., memory, CD-ROM, CD-RW, DVD, or the like). Such instructions can cause a computer to perform the method.

V. Exemplary Implementation Environment

Figure 11:
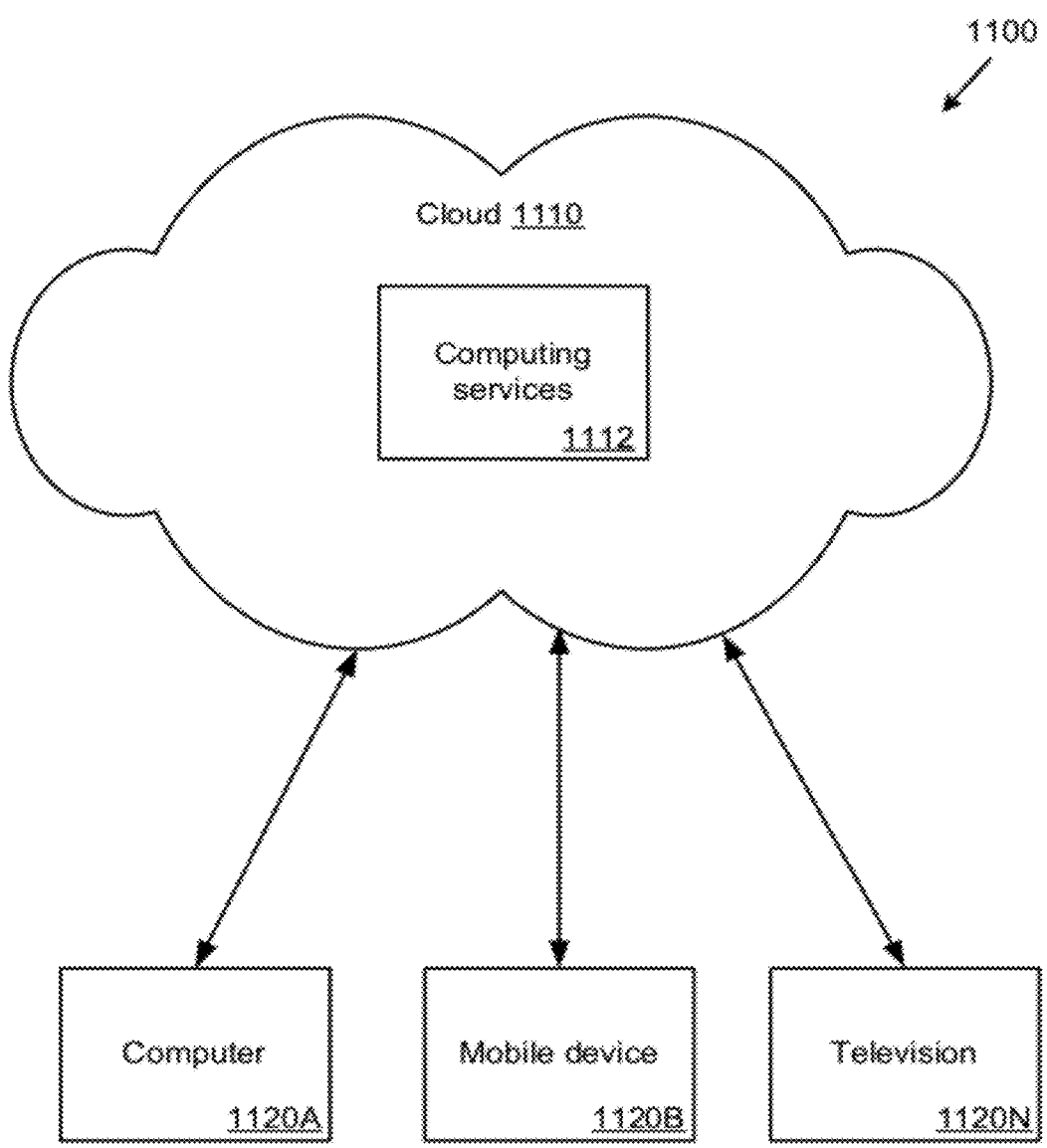
FIG. 11 is a block diagram of an exemplary cloud computing arrangement suitable for implementing technologies described herein.

FIG. 11 illustrates a generalized example of a suitable implementation environment 1100 in which described embodiments, techniques, and technologies may be implemented.

In example environment 1100, various types of services (e.g., computing services 1112, which can include any of the methods described herein) are provided by a cloud 1110. For example, the cloud 1110 can comprise a collection of computing devices, which may be located centrally or distributed, that provide cloud-based services to various types of users and devices connected via a network such as the Internet. The cloud computing environment 1100 can be used in different ways to accomplish computing tasks. For example, with reference to the described techniques and tools, some tasks, such as processing user input and presenting a user interface, can be performed on a local computing device, while other tasks, such as storage of data to be used in subsequent processing, can be performed elsewhere in the cloud.

In example environment 1100, the cloud 1110 provides services for connected devices with a variety of screen capabilities 1120A-N. Connected device 1120A represents a device with a mid-sized screen. For example, connected device 1120A could be a personal computer such as desktop computer, laptop, notebook, netbook, or the like. Connected device 1120B represents a device with a small-sized screen. For example, connected device 1120E could be a mobile phone, smart phone, personal digital assistant, tablet computer, and the like. Connected device 1120N represents a device with a large screen. For example, connected device 1120N could be a television (e.g., a smart television) or another device connected to a television or projector screen (e.g., a set-top box or gaming console).

A variety of services can be provided by the cloud 1110 through one or more service providers (not shown). For example, the cloud 1110 can provide services related to mobile computing to one or more of the various connected devices 1120A-N. Cloud services can be customized to the screen size, display capability, or other functionality of the particular connected device (e.g., connected devices 1120A-N). For example, cloud services can be customized for mobile devices by taking into account the screen size, input devices, and communication bandwidth limitations typically associated with mobile devices.

VI. Exemplary Mobile Device

Figure 12:
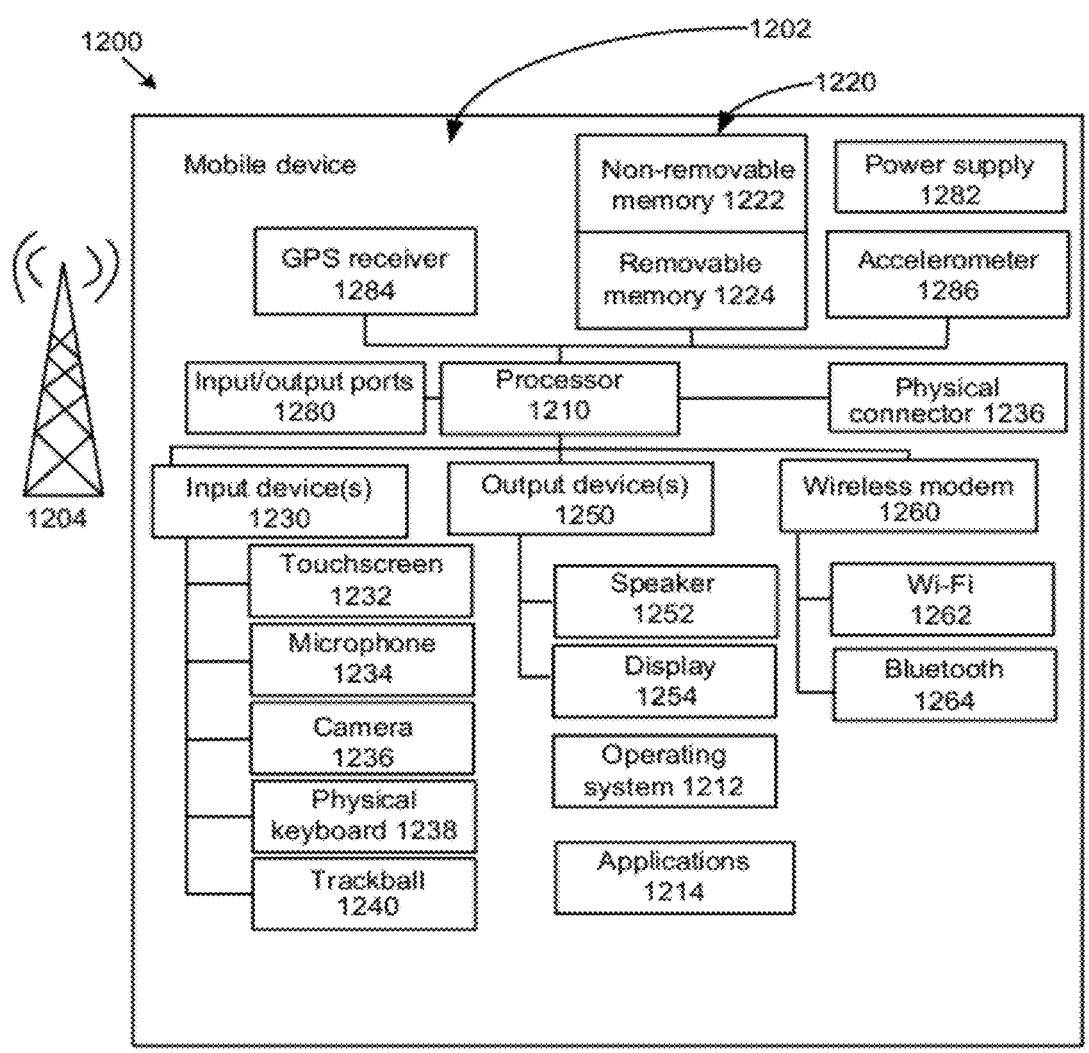
FIG. 12 is a block diagram of an exemplary mobile device suitable for implementing technologies described herein.

FIG. 12 is a system diagram depicting an exemplary mobile device 1200 including a variety of optional hardware and software components, shown generally at 1202. Any components 1202 in the mobile device can communicate with any other component, although not all connections are shown, for ease of illustration. The mobile device can be any of a variety of computing devices (e.g., cell phone, smartphone, handheld computer, personal digital assistant (PDA), etc.) and can allow wireless two-way communications with one or more mobile communications networks 1204, such as a cellular or satellite network.

The illustrated mobile device can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The application programs can include common mobile computing applications (e.g., include email applications, calendars, contact managers, web browsers, messaging applications), or any other computing application. The mobile computing applications can further include an application for performing any of the disclosed techniques.

The illustrated mobile device can include memory 1220. Memory 1220 can include non-removable memory 1222 and/or removable memory 1224. The non-removable memory 1222 can include RAM, ROM, flash memory, a disk drive, or other well-known non-transitory storage technologies. The removable memory 1224 can include flash memory or a Subscriber Identity Module (SIM) card, which is well known in GSM communication systems, or other well-known non-transitory storage technologies, such as smart cards. The memory 1220 can be used for storing data and/or code for running the operating system 1212 and the application programs 1214, including an application program for performing any of the disclosed techniques. Example data can include web pages, text, images, sound files, video data, or other data sets to be sent to and/or received from one or more network servers or other mobile devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device can support one or more input devices 1230, such as a touchscreen 1232, microphone 1234, camera 1236, physical keyboard 1238 and/or trackball 1240 and one or more output devices 1250, such as a speaker 1252 and a display device 1254. Other possible output devices (not shown) can include a piezoelectric or other haptic output device. Some devices can serve more than one input/output function. For example, touchscreen 1232 and display 1254 can be combined in a single input/output device.

Touchscreen 1232 can accept input in different ways. For example, capacitive touchscreens can detect touch input when an object (e.g., a fingertip) distorts or interrupts an electrical current running across the surface. As another example, resistive touchscreens can detect touch input when a pressure from an object (e.g., a fingertip or stylus) causes a compression of the physical surface. As another example, touchscreens can use optical sensors to detect touch input when beams from the optical sensors are interrupted. Physical contact with the surface of the screen is not necessary for input to be detected by some touchscreens.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth or Wi-Fi). The wireless modem 1260 is typically configured for communication with one or more cellular networks, such as a GSM network for data and voice communications within a single cellular network, between cellular networks, or between the mobile device and a public switched telephone network (PSTN).

The mobile device can further include at least one input/output port 1280, a power supply 1282, a satellite navigation system receiver 1284, such as a global positioning system (GPS) receiver, an accelerometer 1286, a transceiver 1288 (for wirelessly transmitting analog or digital signals) and/or a physical connector 1290, which can be a USB port, IEEE 1394 (FireWire) port, and/or RS-232 port. The illustrated components 1202 are not required or all-inclusive, as components can be deleted and other components can be added.

VII. Extensions and Alternatives

Various alternatives to the examples described herein are possible. For example, techniques described with reference to flowchart diagrams can be altered by changing the ordering of stages shown in the flowcharts, by repeating or omitting certain stages, etc. As another example, although some examples are described with reference to specific digital media formats, other formats also can be used.

The various examples described herein can be used in combination or independently. Technology described herein can be used in a computer system with software, hardware, or a combination of software and hardware for processing digital content such as digital video, digital audio or digital images, or in some other system not specifically limited to processing such digital content.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer-implemented method comprising:
with a computing device,
receiving, by a web browser provided by the computing device, markup language code associated with digital content;
parsing the received markup language code to determine a markup language interface call associated with a markup language element representing the digital content, wherein the markup language interface call indicates local playback of the digital content by the computing device;
translating the markup language interface call into translated code that complies with a streaming protocol, wherein the translated code indicates remote playback by a remote digital content playback device that is different from the computing device, wherein the streaming protocol is compliant with a set of digital content playback device interoperability guidelines that enable streaming of the digital content to any of a plurality of digital content playback device types, and wherein the remote digital content playback device is one of the plurality of digital content playback device types;

sending information representing the translated code to the remote digital content playback device, wherein the remote digital content playback device is operable to render the digital content;

opening a stream between the computing device and the remote digital content playback device; and sending information representing the digital content to the remote digital content playback device via the stream.

2. The method of claim 1 wherein the translating is performed automatically in a translation layer of the computing device.

3. The method of claim 1 wherein the computing device is a local computing device on a local network, wherein the remote digital content playback device is a remote device on the local network, and wherein the sending the information is performed over the local network.

4. The method of claim 1 wherein the markup language interface call comprises a call to a method or an attribute of an interface of the markup language element.

5. The method of claim 1 wherein the information representing the digital content comprises encoded media information.

6. The method of claim 5 further comprising:
transcoding the encoded media information to obtain transcoded media information, wherein the transcoded media information is decodable at the remote digital content playback device.

7. The method of claim 1 wherein the markup language element comprises local/remote switching logic, the method further comprising:
using the local/remote switching logic to switch to remote playback at the remote digital content playback device from local playback at the computing device.

8. The method of claim 1 wherein the digital content comprises digital media content, wherein the markup language element comprises a media element associated with a media element interface, and wherein the media element comprises a video element or an audio element.

9. The method of claim 8 wherein the media element interface is an HTMLMediaElement interface, wherein the markup language interface call comprises a call to a method or attribute of the HTMLMediaElement interface, and wherein the information representing the translated code comprises a call to an action of an audio/visual transport service or a rendering control service.

10. The method of claim 1 wherein the digital content comprises digital still image content, and wherein the markup language element comprises an image element associated with an image element interface.

11. The method of claim 10 wherein the image element interface is an HTMLImageElement interface, wherein the markup language interface call comprises a call to an attribute of the HTMLImageElement interface, and wherein the information representing the translated code comprises a call to an action of an audio/visual transport service.

12. One or more computer-readable memory or storage devices having stored thereon computer-executable instructions to cause a computer, when programmed thereby, to perform operations comprising:
receiving, by a web browser, markup language code associated with digital media content;
parsing the received markup language code to determine a markup language interface call associated with a markup language media element representing the digital media content, wherein the markup language interface call indicates local playback of the digital media content by the computer;
in a translation layer, translating the markup language interface call into translated code that complies with a streaming protocol, wherein the translated code indicates remote playback of the digital media content by a remote device in place of local playback by the computer, wherein the streaming protocol is compliant with a set of digital content playback device interoperability guidelines that enable streaming of the digital media content to any of a plurality of digital content playback device types, and wherein the remote device is one of the plurality of digital content playback device types;
opening a stream between the computer and the remote device;
receiving information from the remote device indicating a streaming protocol event associated with the digital media content via the stream; and
in the translation layer, automatically translating the received information indicating the streaming protocol event into a markup language event associated with the markup language media element.

13. The one or more computer-readable memory or storage devices of claim 12 wherein the streaming protocol event is generated in response to user input at the remote device.

14. The one or more computer-readable memory or storage devices of claim 13 wherein the digital media content comprises video content, and wherein the user input comprises video playback control input at the remote device.

15. The one or more computer-readable memory or storage devices of claim 12 wherein the streaming protocol event is a pause, play, stop, playback rate change, or error event for an audio/visual transport service.

16. The one or more computer-readable memory or storage devices of claim 15 wherein the audio/visual transport service is a UPnP AVTransport service, and wherein the markup language event is an HTML5 event.

17. The one or more computer-readable memory or storage devices of claim 12 wherein the streaming protocol event is a change event for a rendering control service.

18. The one or more computer-readable memory or storage devices of claim 17 wherein the rendering control service is a UPnP RenderingControl service, and wherein the markup language event is an HTML5 event.

19. A computing device comprising one or more processors, one or more output devices, and one or more computer readable storage media having stored therein computer-executable instructions for causing the one or more processors, when programmed thereby, to perform operations comprising:
receiving, by a web browser, markup language code associated with digital media content;
performing local playback of the digital media content at the one or more output devices;
receiving user input via a user interface;
switching from a local playback mode to a remote playback mode in response to the user input; and
in response to the switching:
translating portions of the received code that represent markup language interface calls indicating local playback into translated code indicating remote playback at a remote device on a local network, wherein the translated code complies with a streaming protocol that is compliant with a set of device interoperability guidelines that enable streaming of the digital media content to any of a plurality of device types, and wherein the remote device is one of the plurality of device types;

sending information representing the translated code to the remote device, wherein the remote device is operable to render the digital media content;

opening a stream between the computing device and the remote device; and sending information representing the digital media content to the remote device via the stream.

20. The computing device of claim 19, wherein the markup language interface calls comprise calls to a method or an attribute of an HTMLMediaElement interface.

* * * * *